(12) United States Patent
Patil et al.

(10) Patent No.: US 9,686,369 B2
(45) Date of Patent: Jun. 20, 2017

(54) SYSTEM AND METHOD FOR MULTIHOP SERVICE DISCOVERY WITH MEMBER STATION PROXY SERVICE ADVERTISEMENTS

(71) Applicant: QUALCOMM Incorporated, San Diego, CA (US)

(72) Inventors: Abhishek Pramod Patil, San Diego, CA (US); George Cherian, San Diego, CA (US); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 14/457,851

(22) Filed: Aug. 12, 2014

(65) Prior Publication Data

US 2015/0081840 A1    Mar. 19, 2015

Related U.S. Application Data

(60) Provisional application No. 61/877,858, filed on Sep. 13, 2013, provisional application No. 61/969,652, filed on Mar. 24, 2014.

(51) Int. Cl.
*G06F 15/167* (2006.01)
*H04L 29/08* (2006.01)
(Continued)

(52) U.S. Cl.
CPC .............. *H04L 67/28* (2013.01); *H04L 67/32* (2013.01); *H04W 8/005* (2013.01); *H04W 84/18* (2013.01); *H04W 88/04* (2013.01)

(58) Field of Classification Search
CPC ......... H04L 29/08; H04L 67/28; H04L 67/32; H04W 8/005; H04W 84/18; H04W 88/04
(Continued)

(56) References Cited

U.S. PATENT DOCUMENTS 5,970,479 A    10/1999  Shepherd
7,620,816 B1 *  11/2009  Vigue ................. G06Q 20/027
                                                    713/176
(Continued)

OTHER PUBLICATIONS

International Search Report and Written Opinion—PCT/US2014/050936—ISA/EPO—Nov. 25, 2014.

*Primary Examiner* — Tauqir Hussain
(74) *Attorney, Agent, or Firm* — Knobbe, Martens, Olson & Bear

(57) ABSTRACT

Systems and methods for multi-hop service discovery within a mobile device cluster are disclosed. A seeker station may be seeking or may have found a desired service available from a provider station. The seeker station may receive the service announcement from the provider station, and become a proxy station, expanding the service area of the provider station. The proxy station may selectively transmit services and advertisements for services on behalf of the provider station based on restrictions placed on selection as a proxy station. Restrictions or conditions may be placed on the proxy station limiting the number of stations that may become proxy stations, limiting traffic within the cluster. Some restrictions may require a proxy station to be a member of the cluster or a member of a group within the cluster. Selection as a proxy station and frequency of transmission of service announcements by proxy stations may also be conditioned on various specific parameters or combinations of parameters as specified by the provider station.

18 Claims, 18 Drawing Sheets

(51) Int. Cl.
*H04W 8/00* (2009.01)
*H04W 84/18* (2009.01)
*H04W 88/04* (2009.01)

(58) Field of Classification Search
USPC .......................................................... 709/217
See application file for complete search history.

(56) References Cited

U.S. PATENT DOCUMENTS

| | | |
|---|---|---|
| 7,725,375 B2 | 5/2010 | Shepherd et al. |
| 2004/0162871 A1* | 8/2004 | Pabla .................... H04W 8/005 709/201 |
| 2009/0138713 A1* | 5/2009 | Veillette ................. G01D 4/004 713/171 |
| 2009/0245133 A1* | 10/2009 | Gupta ................... H04W 48/14 370/254 |
| 2010/0322213 A1* | 12/2010 | Liu ........................ H04L 67/16 370/338 |
| 2013/0182795 A1 | 7/2013 | Cherian et al. |

* cited by examiner

SYSTEM AND METHOD FOR MULTIHOP SERVICE DISCOVERY WITH MEMBER STATION PROXY SERVICE ADVERTISEMENTS

CROSS REFERENCE TO RELATED APPLICATIONS

This application claims priority under 35 U.S.C. §119(e) to U.S. Provisional Patent Application No. 61/877,858, filed Sep. 13, 2013, entitled "SYSTEM AND METHOD FOR MULTIHOP SERVICE DISCOVERY WITH MEMBER STATION PROXY SERVICE ADVERTISEMENTS," and U.S. Provisional Patent Application No. 61/969,652, filed Mar. 24, 2014, entitled "SYSTEM AND METHOD FOR MULTIHOP SERVICE DISCOVERY WITH MEMBER STATION PROXY SERVICE ADVERTISEMENTS," which are hereby incorporated by reference in their entireties.

BACKGROUND

Technological Field

The present disclosure is generally related to Neighbor Awareness Networking (NAN) or Neighborhood Aware Networks, and more particularly to systems, methods, and devices for using a proxy services in a wireless communication network.

Description of Related Art

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may each be configured to provide services. For example, a device may include hardware, such as a sensor, that is used to capture data. An application running on the device may then use the captured data to perform an operation. In some cases, the captured data may be useful to other devices in the wireless network. The other devices in the wireless network could include similar hardware so as to capture similar data. Alternatively, the device could provide these services (e.g., the captured data) to the other devices in the wireless network. The device may inform the other devices in the wireless network of the services that the device provides by advertising this information over the wireless network. Other devices may further advertise the services provided by a device, acting as a proxy, to other devices not within range or capable of direct communication with the service provider. However, if one or more devices in the wireless network advertise the services that each respective device provides, this may result in increased power consumption by the respective devices and/or increase a number of packet collisions in the wireless network. Thus, improved systems, methods, and devices for communicating in a wireless network are desired.

SUMMARY

An embodiment of the disclosure is a method for using proxy messages in a neighbor aware network. The method may comprise receiving, by a first proxy station, a service advertisement of a provider station, the service advertisement indicating services provided by the provider station. The method may further comprise selectively transmitting in response to the receiving, a first proxy broadcast message, the first proxy broadcast message comprising the service advertisement. The method may further comprise receiving, in response to the transmitting, a discovery request from a seeker station, the seeker station being more than one hop from the provider station, the discovery request requesting services from the provider station.

An embodiment of the present disclosure is a device for using proxy announcement messages in a neighbor aware network. The device may comprise a receiver configured to receive a service advertisement from a provider station, the service advertisement indicating services provided by the provider station. The device may further comprise a transmitter configured to selectively transmit, in response to the service advertisement, a first proxy broadcast message comprising the service advertisement. The receiver may be further configured to receive a discovery request from a seeker station. The seeker station may be positioned more than one hop from the provider station. The discovery request may request services from the provider station.

An embodiment of the present disclosure is a device for using proxy announcement messages in a neighbor aware network. The device may comprise first means for receiving a service advertisement from a provider station, the service advertisement indicating services provided by the provider station. The device may further comprise first means for selectively transmitting a first proxy broadcast message comprising the service advertisement. The first receiving means may be further configured to receive a discovery request from a seeker station, the seeker station may be positioned more than one hop from the provider station, and the discovery request may request services from the provider station.

An embodiment of the present disclosure is a non-transitory computer readable medium. The non-transitory computer readable medium may store code that when executed causes the device to receive a service advertisement from a provider station, the service advertisement indicating services provided by the provider station. The code may further cause the device to selectively transmit a first proxy broadcast message comprising the service advertisement. The code may further cause the device to receive a discovery request from a seeker station, the seeker station being positioned more than one hop from the provider station, the discovery request requesting services from the provider station.

DETAILED DESCRIPTION

Figure 1A:
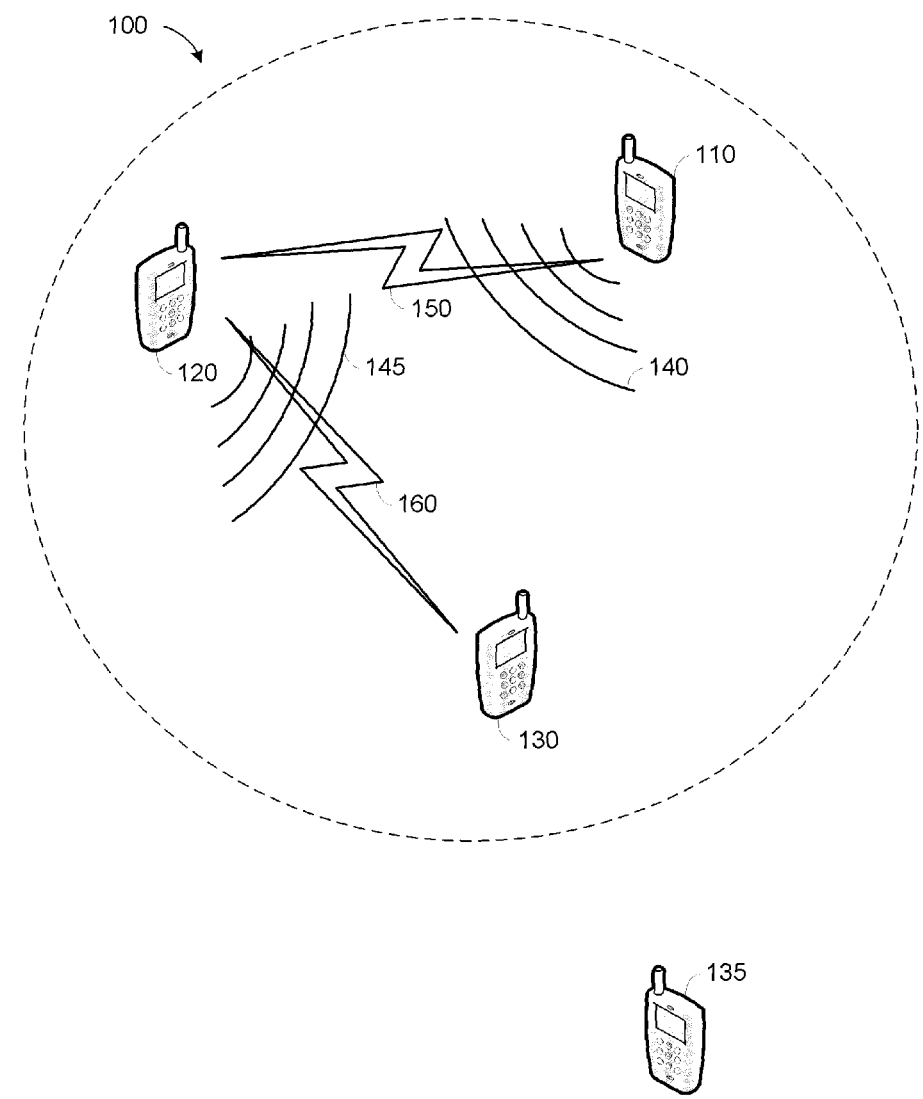
FIG. 1A depicts a particular illustrative embodiment of a mobile device cluster.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals in a sub-gigahertz band may be transmitted according to the 802.11ah protocol or the 802.11ac protocol using orthogonal frequency-division multiplexing (OFDM), direct-sequence spread spectrum (DSSS) communications, a combination of OFDM and DSSS communications, or other schemes. Implementations of the 802.11ah protocol or the 802.11ac protocol may be used for sensors, metering, and smart grid networks. Advantageously, aspects of certain devices implementing the 802.11ah protocol or the 802.11ac protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah or 802.11ac) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard or the 802.11ac standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Mesh networks may be used for static topologies and infrastructure-less networks. A NAN framework may only provide for 1-hop service discovery. Alternatively, the Social Wi-Fi mesh may extend the capabilities of devices participating in the NAN to perform multi-hop service discovery and establish a data path for content delivery between devices.

As disclosed below, multiple STAs may participate in Neighbor Awareness Networking or be members of a neighbor aware network (NAN). As used herein, a NAN may refer to the Neighbor Awareness Networking Task Group in Wi-Fi Alliance networking task group or a physical grouping of wireless devices participating in a social Wi-Fi or mesh network, as discussed below. A NAN comprising multiple STAs may further implement the methods and systems disclosed herein. A NAN may further be referenced in terms of "Social Wi-Fi," referring to the social or peer-to-peer aspects of a "neighborhood." Accordingly, "NAN" or "social Wi-Fi" may be used interchangeably, and the terms may have the same meaning. Additionally, the term "Social Wi-Fi Mesh" or "Social Wi-Fi Mesh network," which may be a network comprising a subset of devices of the NAN cluster, may also be referred to as "NAN data paths" or "data paths (DPs)." Each of the Social Wi-Fi Mesh networks may support one or more applications or services. Finally, the term "Mesh" or "Mesh STA" or "Mesh group" may be interchangeably referred to as a "data path group." These terms may refer to the subset of devices of a NAN cluster that shares a paging window (PW) and may have common security credentials for the devices within the subset. In some embodiments, the devices of the data path group may be single-hop or multi-hop neighbors of each other. In some embodiments, the data path group may be restricted based on security credentials, and, accordingly, require out-of-band credentialing. It should be noted that while these concepts may be described in relation to mesh networks or neighborhood aware networks, other peer-to-peer networks or data distribution networks may be used to implement the processes and principles disclosed herein.

Referring to FIG. 1A, a particular illustrative embodiment of a mobile device cluster 100 is shown. The mobile device cluster 100 comprises a first mobile device 110, a second mobile device 120, and a third mobile device 130. The three mobile devices 110, 120, 130 may be referred to be "members" of the cluster as the three noted devices may be either actively or passively seeking the same service(s), using a service provided by another member device, or providing a service to another member device. A fourth mobile device 135 is also depicted; however mobile device 135 is not associated or connected with any of the services of cluster 100. Thus, fourth mobile device 135 is not currently a member of the cluster 100. The present disclosure may refer to the use of mobile devices 110, 120, 130, 135 in the context of a NAN or other wireless network. Likewise, such mobile devices 110, 120, 130, 135 may alternatively be referred to as stations or "STAs" herein.

In at least one embodiment, the mobile device cluster 100 may be a NAN, and one or more of the mobile devices 110, 120, 130 may be associated with a particular common mobile device application. For example, each of the mobile devices 110, 120, 130 may associate with a respective common mobile device application, such as a social networking mobile device application, a gaming mobile device application, or a combination thereof. Mobile device 135 may also be using the same application, however according to FIG. 1A, device 135 is not a member STA of the cluster 100, thus not using the application with the other depicted STAs.

In operation, mobile devices of the plurality of mobile devices of FIG. 1A may communicate wirelessly according to one or more wireless communication protocols. For example, in at least one embodiment, mobile devices of the plurality of mobile devices 100 may send and receive discovery messages, such as a discovery beacon associated with an Institute of Electrical and Electronics Engineers (IEEE) 802.11 protocol. As another example, mobile devices of the plurality of mobile devices 100 may communicate via a network advertisement protocol that is common to each mobile device of the plurality of mobile devices 110, 120, 130, and 135. In this context, a protocol refers to parameters used to communicate, such as a channel on which communications occur, timing of communications (e.g., timing of discovery intervals), etc. In another example, the mobile devices of the mobile device cluster 100 may also communicate data, such as data associated with a particular application that is common to each mobile device of the mobile device cluster 100.

In the embodiment depicted in FIG. 1A, the first mobile device 110 may transmit a beacon or other broadcast transmission including a service advertisement 140 including information associated with a provided service. In an embodiment, the service advertisement 140 may be broadcast from a provider STA (e.g. device 110). The term "provider STA" as used herein indicates the capability to provide a particular service ("provider station"). The second mobile device 120 may receive the service advertisement and desire to connect with the first mobile device 110 in order to make use of the provided service. In this context, second mobile device 120 may be referred to as a "seeker station," or a station that is looking for ("seeking") a particular service. In an embodiment, such a service may be a particular sensor (e.g., a GPS receiver or a thermometer) employed by the first mobile device 110, or other capabilities. In an embodiment, the services provided may further comprise file, photo, and/or video sharing. The discovery request 150 may be sent by device 120 during a time interval associated with advertisement of the mobile device cluster 100 to potential members of the mobile device cluster 100, such as a discovery interval. The service advertisement 140 and discovery request 150 may be a beacon in connection with wireless protocol such as an IEEE 802.11 ah protocol or other standard providing wireless connection.

In the particular example of FIG. 1A, the first mobile device 110 may receive the discovery request 150 from the second mobile device 120. In response to receiving the first discovery request 150, the first mobile device 110 may use the information in the first discovery request 150 to communicate with the device 120, sending a response (not shown) after the discovery interval and complete the required handshake to provide requested services to mobile device 120.

While device 120 is considered a seeker STA with respect to the services provided by device 110, device 120 may further be a provider STA with respect to another station within the cluster 100, in the event device 120 makes its own services available to the cluster 100. The third mobile device 130 may also be present within range of the cluster 100 following a similar process. Analogous to the service advertisement 140, the second mobile device 120 may also advertise available services with the service advertisement 145 that reaches the third mobile device 130. The third mobile device 130 is then also considered a seeker STA, and responds to the service advertisement 140 with a discovery request 160 of its own. The device 120 may then respond and provide the requested services to the third mobile device 130. This process may occur multiple times adding new mobile devices to a given cluster 100.

As shown, the fourth mobile device 135 is not currently associated with cluster 100. In an embodiment, the device 135 may not be within range of the service advertisements 140, 145 thus it is not aware of the services available within cluster 100 and thus cannot request services. Similarly, the device 135 may transmit a discovery request seeking a given service (not shown in this figure) but due to the distance between the device 135 and the provider STAs 110, 120 the discovery request may not be received. As discussed below, a station acting as a proxy station may provide services to device 135 on behalf of the provider STA 110, 220. In an embodiment, mobile device 130 may be able to provide proxy services from mobile device 120 to device 135.

As will be discussed more thoroughly below with respect to FIGS. 2, 3, and 4, once the mobile device 130 is connected to and receiving services from the device 120, it may act as a proxy station ("proxy STA") for the services provided by the device 120. In an embodiment, the device 120 then becomes a provider STA 120 and the proxy STA 130 may broadcast service advertisements on behalf of the provider STA 120. In the event that a broadcast from the proxy STA 130 reaches device 135 and the services are sought by device 135, the same process may occur as device 135 sends a discovery request to the provider STA 120 and may then become a seeker STA 135, utilizing the services of provider STA 120 through proxy STA 130. Further details regarding providers STAs and proxy STAs are discussed below. In an embodiment, if the provider STA 120 offers multiple services, the proxy STA 130 may proxy all of the services, even if the proxy STA 130 consumes at least one service provided by the provider STA 120.

Figure 1B:
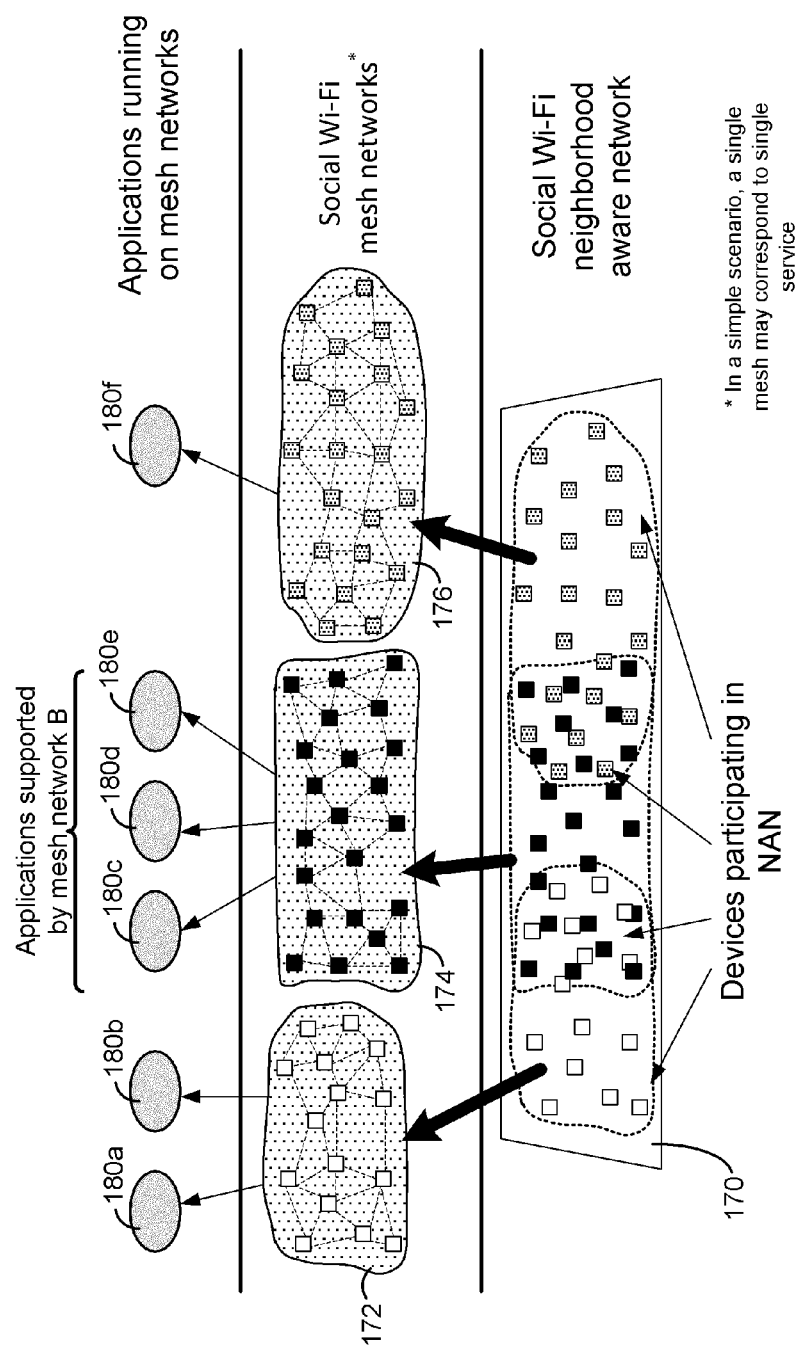
FIG. 1B depicts an illustrative embodiment of multiple NANs in accordance with the disclosure.

FIG. 1B depicts an illustrative embodiment of a NAN in accordance with the present disclosure. As shown, a plurality of devices within a cluster 170 is participating in a social Wi-Fi NAN. The plurality of devices within the cluster 170 may comprise a given NAN. In an embodiment, each of the devices within the cluster 170 may be using a service or services designated by the NAN as a whole, or as shown, the service may be delineated according to smaller groups within the cluster 170 referred to herein as mesh 172, a mesh 174, or a mesh 176. Accordingly, a given NAN (e.g., the cluster 170) may comprise multiple meshes. Each of the respective meshes (the mesh 172, the mesh 174, and the mesh 176) may comprise a common service, a common operating system, a common platform (e.g., a particular brand of smartphone, or computer), or other relevant commonality. Each of the meshes 172, 174, 176 may then comprise an individual mesh network. As a non-limiting example, the mesh 172 of NAN STAs may form a Social Wi-Fi mesh for transport of data, while the mesh 174 may be utilizing GPS services, video/photo sharing, or even games.

In an embodiment, the cluster 170 and the meshes 172, 174, 176 may each be capable of supporting multiple services. Within each NAN, or within each of the meshes 172, 174, 176 (within the NAN), each device may become a proxy for services provided by the respective mesh or NAN. In an embodiment, where a mesh supports multiple services, then all of the STAs participating in the mesh may proxy the mesh services (e.g., all of the services provided by the mesh) regardless of whether the individual proxy STA is actually consuming the service. In an embodiment, certain limitations to such proxy status may be imposed. Such limitations are found in the following disclosure and depicted in the figures, particularly in FIG. 4A-FIG. 5.

In an embodiment, a further abstraction may be implemented, delineating what particular applications 180 might be supported by the particular mesh. In an embodiment, the STAs that are part of the meshes 172, 174, 176 (i.e., participating in the respective Social Wi-Fi mesh) may normally act as a proxy for service discovery packets (as described above) for all the services supported by the mesh, while also forwarding the data associated with the services supported by the particular mesh, for example the meshes 172, 174, 176. Therefore each mesh may comprise a plurality of STAs that consume and/or proxy one or more of the mesh's services.

As a non-limiting example, a STA 130 (FIG. 1A) seeking a particular service may join the cluster 100. Accordingly, the STA 130 may then serve as a proxy STA 130 for the services provided by the cluster 100. In an embodiment, the cluster 100 may provide multiple services similar to the applications 180 a, 180b provided by mesh 172 and the applications 180c-180e provided by mesh 174. If the proxy STA 130 joins such a mesh that provides multiple services (e.g., mesh 174) but only seeks a single a service (e.g., application 180d), the proxy STA 130 may still proxy for the other services provided by the mesh 174 (e.g., applications 180c-180e).

Figure 2:
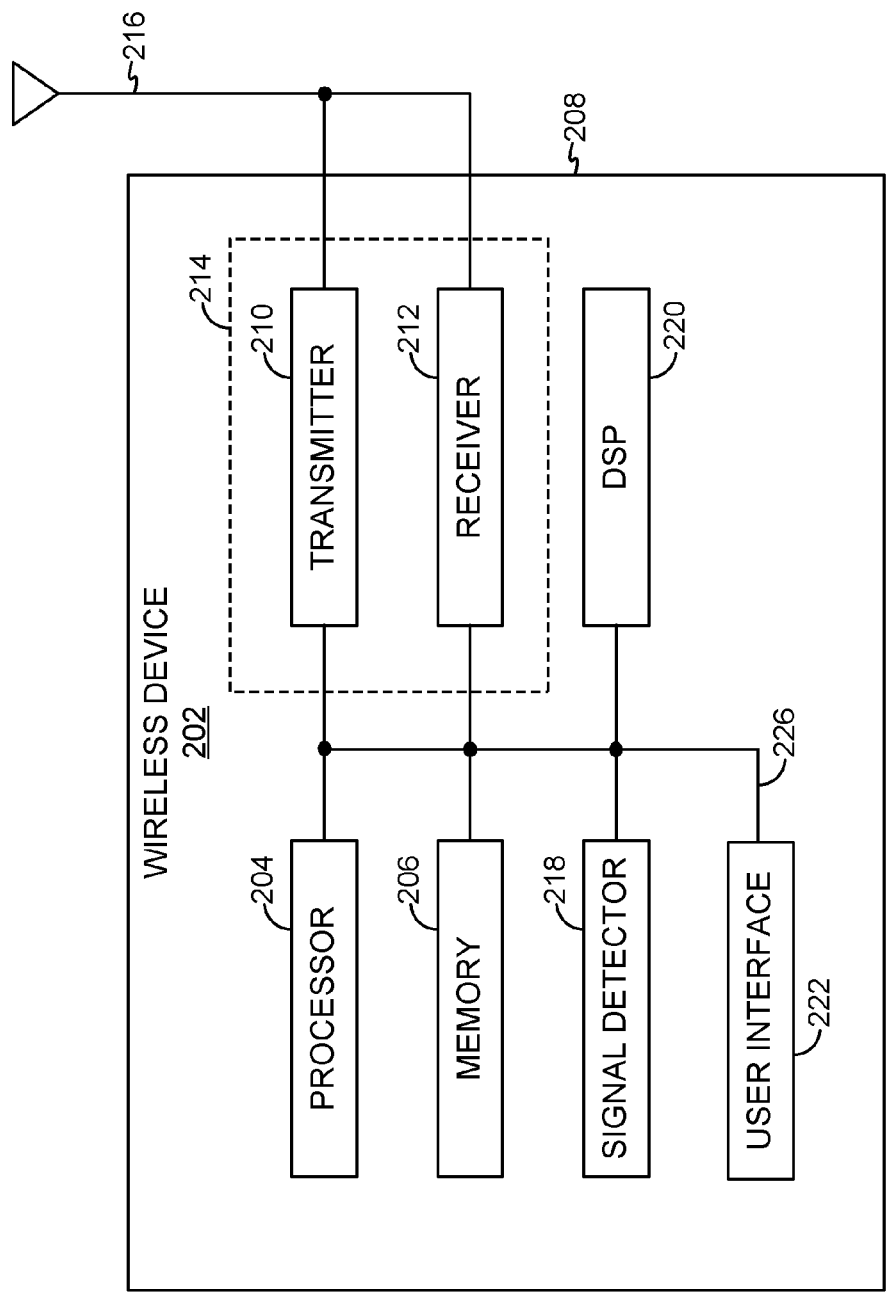
FIG. 2 is a functional block diagram depicting a wireless device of one or more of the mobile devices of FIG. 1A.

FIG. 2 shows an exemplary functional block diagram of a wireless device 202 that may be employed within the cluster 100 of FIG. 1A. The wireless device 202 is an example of a device that may be configured to implement the various methods described herein. For example, the wireless device 202 may comprise one of the stations 110, 120, 130.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

The wireless device 202 may comprise a STA 110, 120, 130, 135, and may be used to transmit and/or receive communications. That is, STAs 110, 120, 130, 135, may serve as transmitter or receiver devices. Certain aspects contemplate signal detector 218 being used by software running on memory 206 and processor 204 to detect the presence of a transmitter or receiver.

As described above, a wireless device, such as wireless device 202, may be configured to provide services within a wireless communication system, such as the wireless communication system 100. For example, the wireless device 202, such as STAs 110, 120, 130, 135, may include hardware (e.g., a sensor, a global positioning system (GPS), etc.) that is used to capture or calculate data (e.g., sensor measurements, location coordinates, etc.). An application running on a STA 110, 120, 130, 135 may then use the captured or calculated data to perform an operation. In some cases, the captured or calculated data may be useful to other STAs in the wireless communication system 100. The STAs 110, 120, 130, 135, could include similar hardware so as to capture or calculate similar data. For example, the STAs 110, 120 could provide these services (e.g., the captured or calculated data) to the other STAs 130, 135. The STAs 110, 120 may inform the other STAs 130, 135 of the services that the STAs 110, 120 provide by advertising this information over the wireless cluster 100 through service announcement broadcasts. Likewise, the STAs 110, 120, 130 may also advertise the services that they provide outside the cluster 100. In this way, a given STA 110, 120, 130 in the cluster 100 may already be aware of services available in the cluster 100 and avoid performing duplicative operations. Such a wireless communication system may be referred NAN. As described herein, "service announcements" may also be referred to as "service advertisements," relating to the same concept of a given provider STA informing other wireless devices of available services.

However, while the STAs 110, 120, 130 in the cluster 100 may benefit if one or more of the STAs 110, 120, 130 advertise the services that they each respectively provide, other problems may occur. For example, the advertisement of services generally occurs by transmitting a periodic message that includes the service information, such as advertisements 140, 145. The communication circuitry, such as transceiver 214, may remain active in order to transmit the periodic messages and/or to receive requests for services from other STAs 110, 120, 130, 135. Accordingly, a given STA 110, 120, 130, 135 may consume an increased amount of power. For the STA 110, 120 that is connected to a source of continuously available power (e.g., a power outlet, an energy harvesting device, etc.), the increased power usage may not be a concern. On the other hand, for the STAs 110, 120, 130, 135 that are battery-powered, the increased power usage may be problematic.

In addition, service advertisements may lead to an increase in the number of packets transmitted within the cluster 100 and the surrounding area. The increase in the number of packets transmitted over a wireless communication system and within the cluster 100 may lead to an increase in the number of packet collisions that occur. The collisions may cause the loss of data and/or may require the STAs 110, 120, 130, 135 to resend packets, further increasing the power consumption.

Likewise, the air link occupancy of the cluster 100 may be increased. For example, each advertisement message 140, 145 transmitted by a STA 110, 120, 130 includes a physical (PHY) layer, a medium access control (MAC) layer, and the data (e.g., information regarding the service(s) provided by the respective STA 106). Thus, the air link occupancy may be increased due to the increased overhead (e.g., the PHY and MAC layers).

In order to avoid or minimize the problems discussed above, a proxy STA may be introduced into the wireless cluster 100. As shown, STAs 110, 120 are the provider STAs, and a proxy STA may be a STA 110, 120, 130 in the cluster 100 that offers to advertise and/or provide services on behalf of one or more other STAs 110, 120. For example, the proxy STA may be a STA 110, 120, 130 connected to a source of continuously available power and may advertise services on behalf of another STA 110, 120, 130 that is battery-powered. A proxy STA may allow other STAs 110, 120, 130, 135 to conserve power by not having to advertise their services and/or remaining active for extended or long periods of time. Since the proxy STA may advertise services on behalf of a plurality of provider STAs, fewer collisions may occur due to the reduced number of packets being transmitted over the wireless communication system 100. Similarly, the air link occupancy may be reduced due to a reduced overhead (e.g., one message that includes a PHY layer, a MAC layer, and data for three STAs is transmitted rather than three separate messages that each include a PHY layer, a MAC layer, and data).

Figure 8:
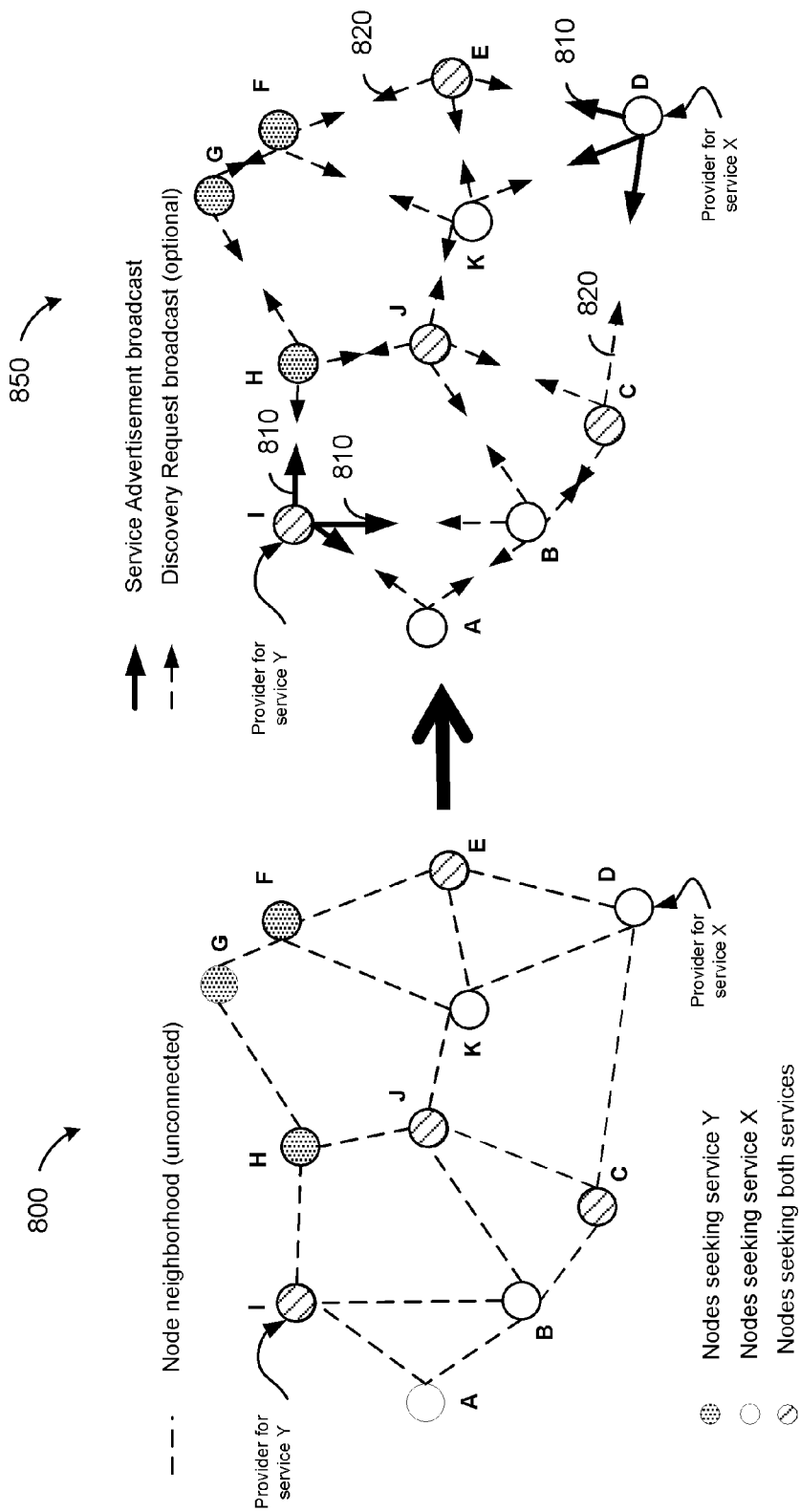
FIG. 8 is an exemplary topology of a wireless cluster implementing one-hop discovery in accordance with the disclosure.
Figure 9:
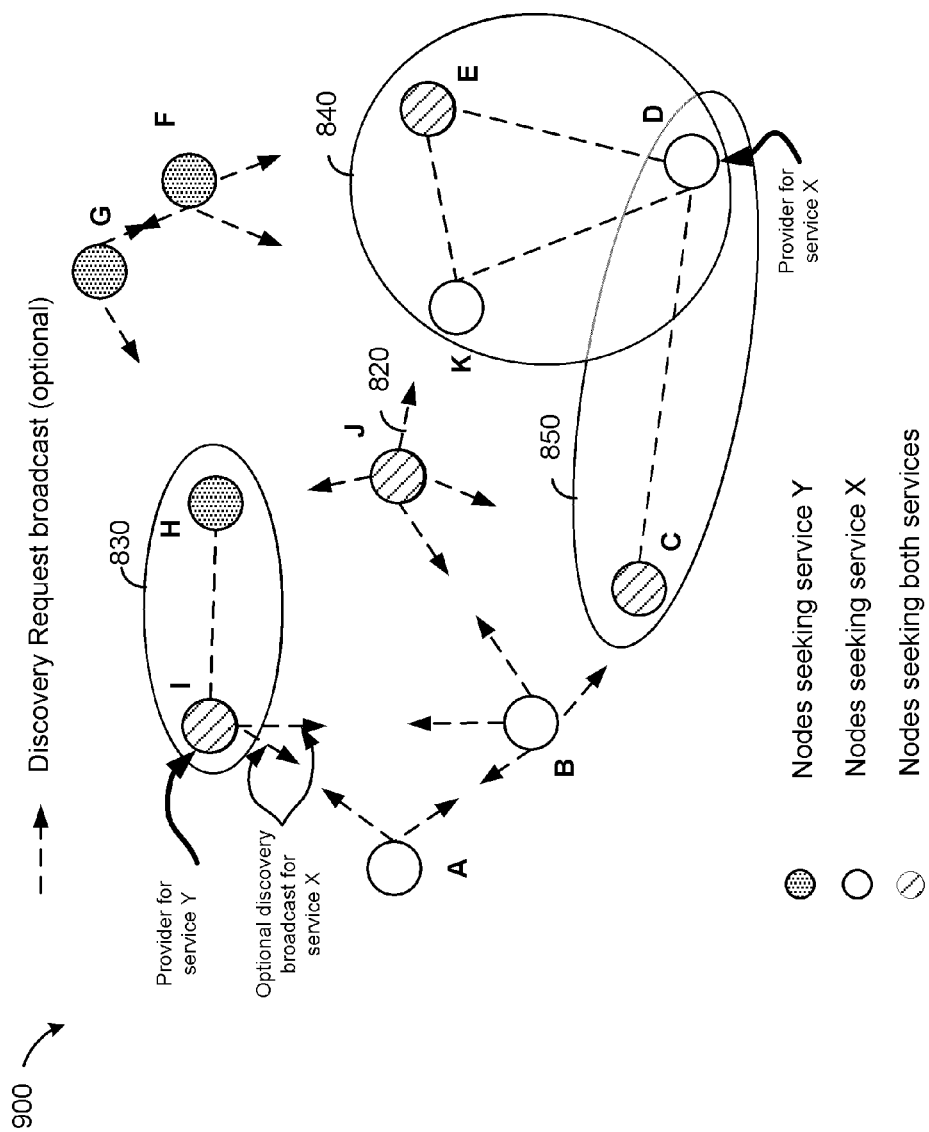
FIG. 9 is an exemplary topology of a wireless cluster implementing one-hop discovery in accordance with the disclosure.
Figure 10:
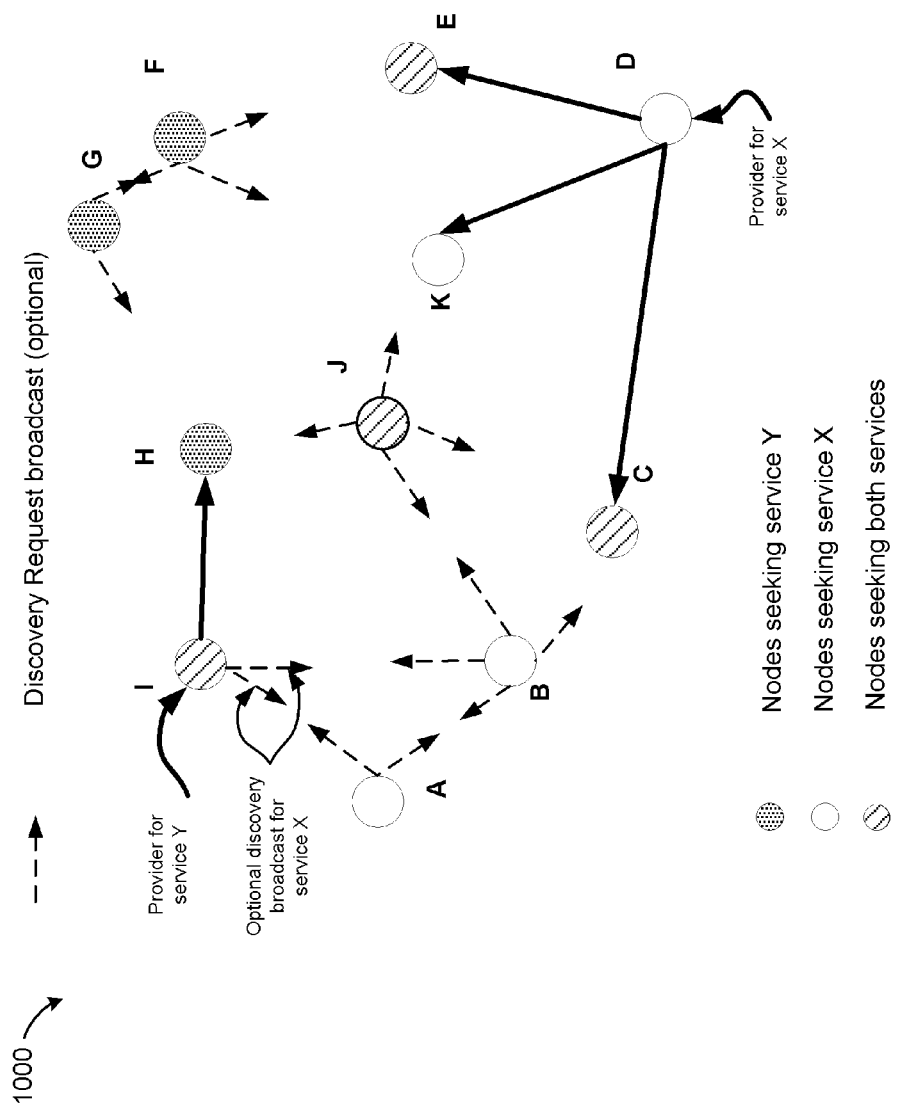
FIG. 10 is an exemplary topology of a wireless cluster implementing one-hop discovery in accordance with the disclosure.

A proxy STA as described also provides increased range and service area for a given provider STA 110, 120. Typically, as described with respect to FIG. 1A, a provider STA 110 may provide services to a seeker STA 120 within the provider STA's own transmission range. This may be referred to herein as a "one hop" away, i.e., seeker STA 120 is "one hop" from the services of the provider STA 110, as shown in FIGS. 8-10. Accordingly, services from the device 120 are "two hops" away from the device 135 assuming, for example, device 130 becomes a proxy STA for services between a provider STA 120 and device 135. Multi-hop service is further discussed below with respect to FIGS. 11-15. Service advertisements are not commonly forwarded beyond one hop, so seeker STAs beyond one hop from the provider STA may never receive the service. As described, an expansion using proxy STAs may advertise and provide service outside the one hop limitation, enabling the provider STA 110 to advertise and provide services beyond a single hop to seeker STAs 120, 130.

In the event the cluster (e.g., the cluster 100) elects to utilize mobile device 130 as a proxy STA, the prosy STA 130 may further broadcast periodic advertisements of the associated services from devices 110, 120. This may allow device 135 to fall within range of a given service advertisement from one of the devices 110, 120. The device 130, then acting as the proxy STA 130, may receive a discovery request from the device 135 and respond with a discovery response on behalf of the provider STA 110, 120, expanding the cluster 100 to eventually include device 135. This may further decrease the device's 135 power consumption as well, by reducing the amount of time and power consumed while seeking services.

In some embodiments, the privacy concerns of having one device (e.g., a proxy STA) advertise services on behalf of another device are minimized. If all of the devices within the cluster 100 are associated with the same user, then the fact that a proxy STA may collect data from another STA is not problematic. For example, if two devices are associated with the same user, the two devices may be located in close proximity to each other. While location information may otherwise be considered private data, no privacy concerns would be raised if the first device advertises location services on behalf of the second device since both are in close proximity to each other (e.g., the first device already knows the location of the second device since they are in close proximity to each other). The election of a proxy STA, the use of more than one proxy STA, the detection of a departure of a STA, and the information provided to proxy STAs is described in greater detail below with respect to the following FIGS.

Figure 3:
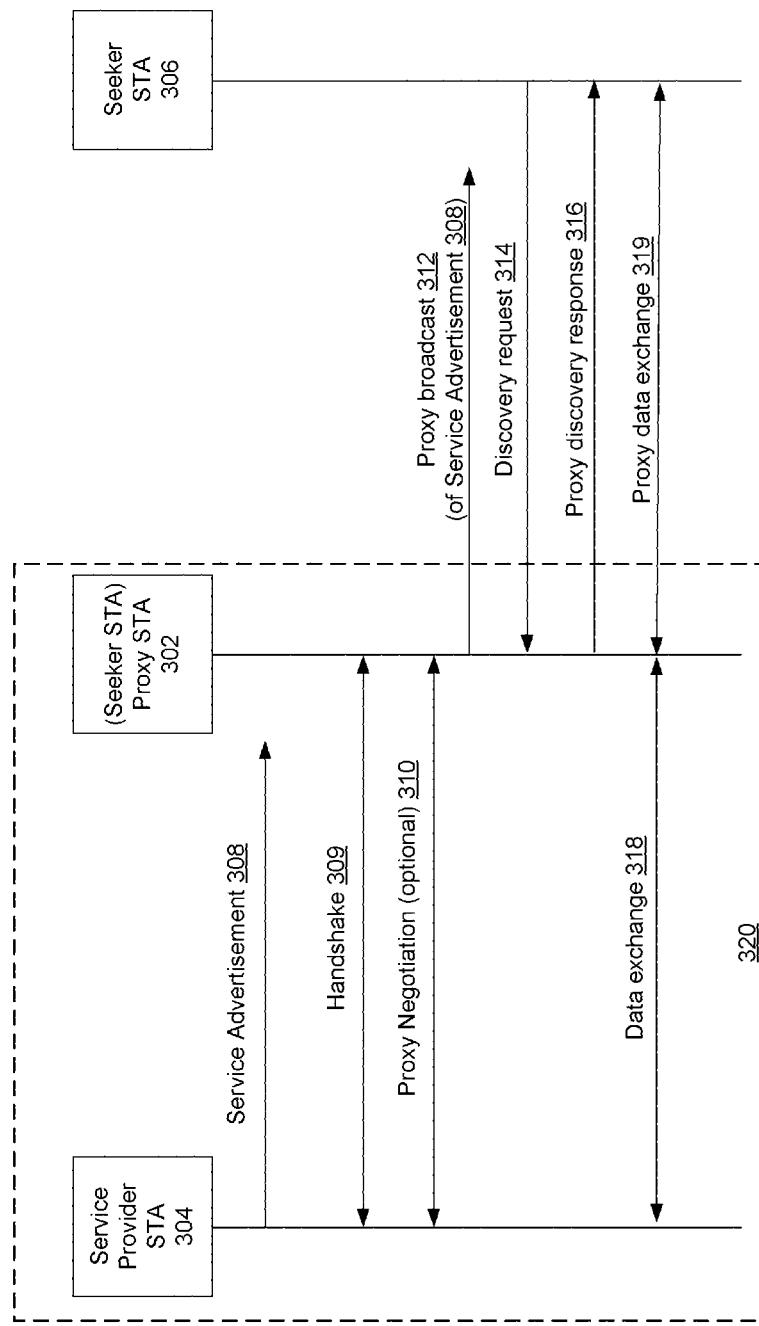
FIG. 3 is a call flow diagram depicting a method of operation of one or more of the mobile devices of FIG. 1A in accordance with the disclosure.

FIG. 3 depicts a call flow diagram 300 representing an exemplary implementation of a proxy service advertisement using a proxy STA 302 in between a provider STA 304 and seeker STA 306. As shown, a cluster 320 may comprise provider STA 304, a seeker STA 302 (that may later become a proxy STA 302), in addition to additional devices as needed. The cluster 320 may be substantially similar to the cluster 100 of FIG. 1A-FIG. 1C. As above, it should be appreciated that virtually any number of STAs may comprise a given cluster 320.

The devices implemented as the various STAs described may be analogous to mobile devices 110, 120, 130, 135, or device 202. Prior to joining the cluster 320, a node, or a STA, may save power and remain silent, minimizing or eliminating transmissions, and passively "listening" for an advertisement for a desired service. Following the receipt of a service advertisement 308, a given STA may become a proxy STA following an appropriate handshake 309. A proxy negotiation 310 with the provider STA 304 may also be required in some implementations, however in certain embodiments a seeker STA 306 in a mesh network, or cluster 320, that receives a service advertisement 308 may automatically serve as the proxy STA 302 if a member of the cluster 320 that supports the associated service.

A seeker STA 306 may also transmit a discovery request and actively seek a service, as opposed to simply listening for a broadcast. Following an appropriate proxy negotiation 310 with the provider STA 304, including evaluation of any applicable parameters or restrictions (discussed below), the proxy STA 302 (formerly a seeker STA 302) may transmit, or retransmit a service advertisement in a proxy broadcast 312, advertising the available services of provider STA 304 beyond one hop, perhaps exceeding two or more hops in some embodiments. The proxy broadcast 312 may be a broadcast repeating information included in the service advertisement 308, and may cover a longer range than would be possible by the provider STA 304 alone. This may make the proxy broadcast 312 and provider STA 304 services available to a STA 306 outside the established cluster 320, to another device, such as seeker STA 306, or to other STAs beyond one or more hops. The seeker STA 306 may be analogous to the mobile device 135 of FIG. 1A, falling outside the service range of devices 110, 120, and the cluster 100, or as depicted in FIG. 3, cluster 320. Once the seeker STA 306 receives the proxy broadcast 312, the seeker STA 306 may respond with a discovery request 314 requesting services from the provider STA 304 through the proxy STA 302. On behalf of the provider STA 304, the proxy STA 302 may respond with a proxy discovery response 316 and further establish communications between the seeker STA 306 and the provider STA 304 (through the proxy STA 302 acting as a relay). The Proxy STA 302, which is also a seeker STA, may use data provided by a data exchange 318 from the provider STA 304 and may further relay the same data in a proxy data exchange 319 to the seeker STA 306. This may allow expansion of services and of the cluster 320 to include at least the seeker STA 306.

In another embodiment, if the STA 306 is not in a power save mode, it may not elect to passively await a proxy broadcast 312, and actively request (via the discovery request 314) a given service from the surrounding STAs within cluster 320. The seeker STA 306 may transmit the discovery request 314 without first receiving the proxy broadcast 312 from the proxy STA 302. In this way, the proxy STA 302 may receive the discovery request 314 prior to transmitting the proxy broadcast 312, relaying the discovery request 314 to the provider STA 304 and providing proxy service to the seeker STA 306.

The use of the proxy STA 302 to expand the service area of the provider STA 304 may allow expansion beyond one hop, to two or more hops, or as is feasible for a given system architecture. In such a scenario, where the seeker STA 302 becomes the proxy STA 302, the same may occur as the seeker STA 306 may become a proxy STA 306, enabling proxy service over multiple hops away from the provider STA 304. Multi-hop discovery provides a low overhead, distributed mechanism for service discovery over multiple hops without requiring seeker STAs 306 to actively collaborate to located desired services.

Expansion of the service area to incorporate multiple proxy STAs 302 may increase available service area the overall size of a cluster 100, allowing multi-hop service discovery, however expansion may further lead to increased data traffic and packet collisions or the flooding of discovery packets. As such it may be advantageous to place certain limits on the number of proxy STAs and which STAs are permitted to become proxy STAs 302. Selection of a proxy STA 302 based on various criteria may provide for reduced traffic and collisions while still providing increased service discovery.

Figure 4A:
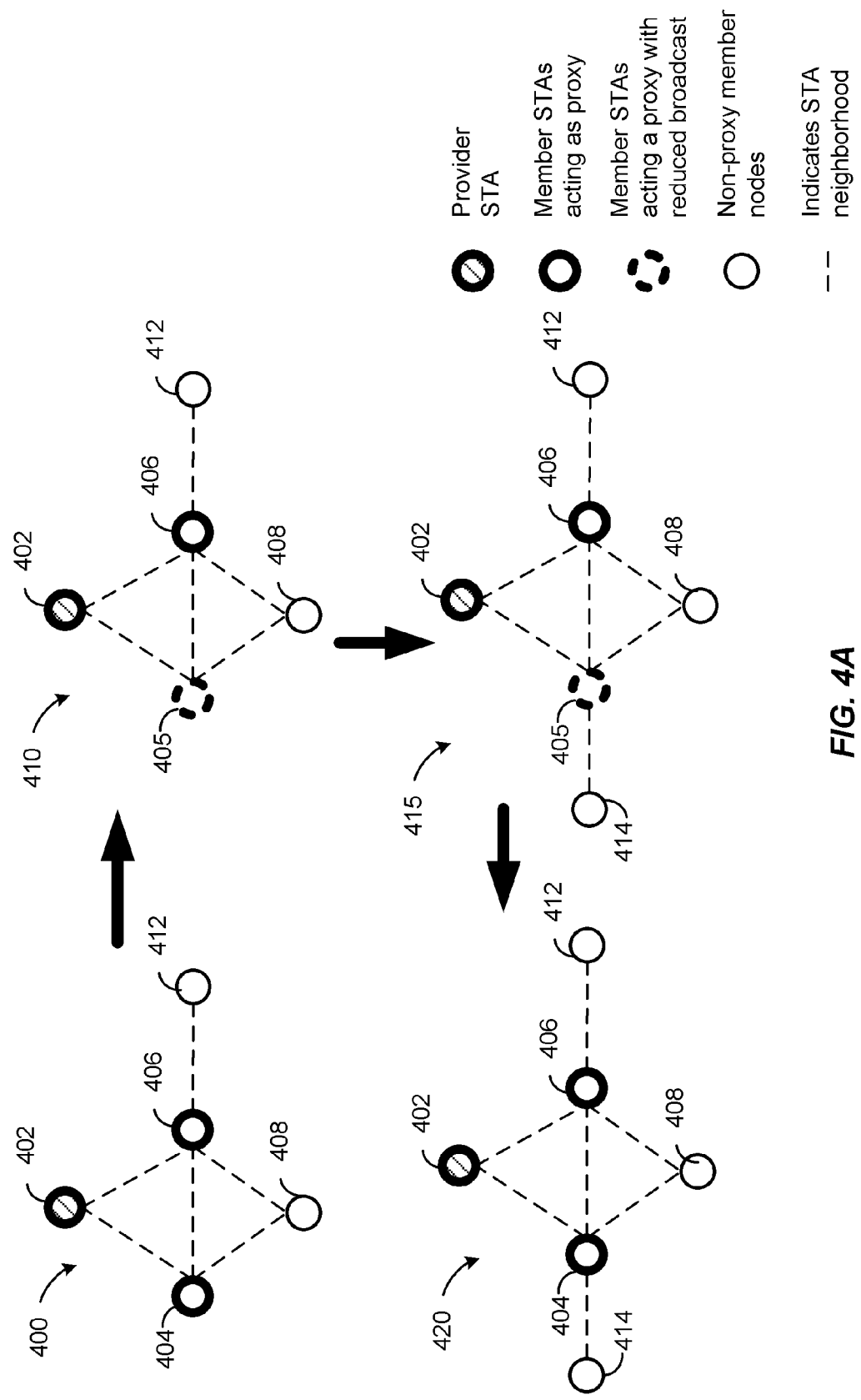
FIG. 4A depicts multiple exemplary topologies of a wireless network depicting an embodiment of a method of operation in accordance with the disclosure.

Referring to FIG. 4A, four exemplary cluster topologies are shown and designated clusters 400, 410, 415, and 420. Each of the four topologies will be discussed in turn and shown with various characteristics, parameter requirements, or restrictions implemented to minimize unnecessary proxy transmissions while retaining the beneficial characteristics of the use of a proxy STA. Each of the clusters 400, 410, 415, 420 may incorporate a version of the transmission and call flow architecture discussed with respect to FIG. 3 in addition to the various restrictions or combinations thereof. Following the three large arrows depicted in FIG. 4A, additional or successively more restrictive conditions may be applied determining which STAs may become proxy STAs, potentially reducing overall traffic and data collisions.

The cluster 400 comprises a provider STA 402, two proxy STAs 404, 406, and two non-proxy, seeker STAs 408 and 412. Each of the STAs listed are said to be "members" of cluster 400 as each of them is interacting (seeking, already discovered, or providing a service) with another member STA. Each of the dashed lines shown in FIG. 4A indicates the various interactions of the clusters 400, 410, 415, 420. Further, each of the clusters 400, 410, 415, 420 may also be referred to as a STA neighborhood or NAN. A given non-member STA may be a STA that, while in range of services, is not currently seeking the provided service, thus not interacting with the cluster.

Prior to joining the cluster 400, a given STA may remain in a power save mode, minimizing any transmissions, passively listening for an advertisement for a desired service. Conversely, such a nonmember node, or STA, may also actively pursue a desired service through the transmission of discovery requests, such as the discovery request 314 discussed with respect to FIG. 3. In the former circumstance, once the STA 408 and the STA 412 receive an advertisement for a desired service, the STA 408 the STA 412 may transmit a discovery request, initiating communications with the cluster 400. In the cluster 400 neither of the proxy STAs 404, 406 have any limitations imposed on their status as a proxy STA, thus both may transmit as needed to advertise for the provider STA 402.

In some embodiments, restrictions limiting proxy broadcasts minimize unnecessary transmissions and place certain limitations on packet traffic. In one exemplary embodiment broadcasts may be reduced by allowing only STAs that are member of the cluster 400 broadcast the service announcement or respond to service discovery requests during the discovery phase. As such, this approach may guarantee successful service discovery so long as the each seeker STA 408, 412 can find at least one other seeker STA in its neighborhood. This condition may be satisfied as the proxy STA 404 and the proxy STA 406 may also be considered seeker STAs as referenced to the provider STA 402.

In the cluster 400, certain restrictions may be placed on which nodes may act as proxy STAs, thereby reducing traffic. One such restriction may limit status as a proxy STA to only those STAs who have actually "found" or located a desired service or services, instead of permitting any and all STAs receiving the service advertisement to broadcast on behalf of the provider STA. In this context a service may be "found" where a potential member STA is either seeking a particular service, or has already encountered a desired service and is either connecting with the provider STA 402 or has already connected. Thus those STAs not actually seeking a given service, even though they are within range of an advertisement, may not be selected to act as a proxy STA under such conditions. This may serve to reduce the number of overall transmissions, further reducing traffic and potentially data loss. Here, the proxy STA 404 and the proxy STA 406 may have been previously seeking or are currently seeking the services provided by the provider STA 402 and may be said to have "found" the service. Accordingly, they are selected to be proxy STAs. As the proxy STA 404 and the proxy STA 406 rebroadcast a service advertisement for the provider STA 402, the seeker STA 408 and the seeker STA 412 may be also passively seeking that service.

In an embodiment, a given NAN cluster (e.g., the cluster 400) may be capable of supporting multiple services as noted previously in FIG. 1B. In the event the STA 404 has found the desired service offered by provider STA 402, the proxy STA 404 may still be capable or required to proxy other services provided by the associated cluster 400, even if the proxy STA 404 is not actually using them. In an embodiment, a mesh (e.g., the meshes 172, 174, 176) may comprise a group of STAs within the NAN cluster, that is the cluster 400 may comprise multiple meshes, as noted with respect to FIG. 1B. Where a mesh supports multiple services, then all of the STAs participating in the mesh may proxy the mesh services (e.g., all of the services provided by the mesh) regardless of whether the proxy STA is actually consuming the service.

In an embodiment, because the provider STA 402, the proxy STA 404, and the proxy STA 406 are broadcasting service announcements for the provider STA 402, the cluster 400 may further expand as more STAs come within range of the service advertisements or receive a discovery request from a nonmember STA in the surrounding area. As shown, the seeker STA 408 and the seeker STA 412 may have recently joined (or may be in the process of joining) the cluster 400 as member STAs utilizing the services of the provider STA 402 through the proxy STA 404 or the proxy STA 406. In the cluster 400, the proxy STA 404 and the proxy STA 406 may relay discovery requests, discovery responses, and the ensuing data transmissions between the provider STA 402 and the seeker STAs 408 and/or the seeker STA 412 while also utilizing the available services. While not shown here, as the seeker STA 408 and the seeker STA 412 become members of the cluster 400 they too may eventually become proxy STAs because they have "found" the service and may fulfill at least some of the restrictions discussed above. The seeker the STA 408 and the seeker STA 412 are shown here as merely seeker STAs (and not proxy STAs) for simplicity.

Turning to the cluster 410 of FIG. 4A, a method to reduce data traffic is shown. As above, the provider STA 402 is providing services to the seeker STA 408 and the seeker STA 412 through the proxy STA 404 and the proxy STA 406, respectively. The proxy STA 406 may retransmit service advertisements on a broadcast basis to the seeker STA 408 and the seeker STA 412. However, with the introduction of further proxy restrictions, the proxy STA 406 may become a limited proxy STA 405, limiting its proxy STA functions.

In an embodiment, limitations may be placed on which nodes may serve as proxy STAs by including certain parameters in the service announcement broadcasts. This type of limitation may serve to further reduce the number of STAs that act as proxy STAs thus reducing traffic and packet collisions. Some limitations may comprise a minimum or maximum "hop count" from the provider STA through proxy STA(s) to the seeker STA(s); a specification that a particular STA 405 may only proxy for its parent provider STA, that is, the provider STA 402 whose service broadcast the would-be proxy STA 405 first received when seeking a service; or alternatively restrictions may be based on a specific list of particular or eligible provider STAs (e.g., the particular neighborhood of the would-be proxy STA 405). Each of these restrictions is discussed below.

Specific location requirements may also be imposed. In an embodiment, location information may be included in the service announcement, indicating a location of the provider STA 402. This location information may be in the form of GPS (global positioning system) coordinates or relative bearing and range information from a provide STA 402. Where seeker the STAs 404, 406, 408, 412 of the cluster 400 are able to determine their own location information, the provider STA 402 location information may be utilized to impose such restrictions. Limitations on distance or bearing may be included the service advertisement or other broadcast, further limiting the number of the possible proxy STAs 404, 406 to specific sectors or ranges surrounding the provider STA 402. Limitations may also be considered where communication or signal reception at a given seeker STA is obstructed by a barrier; such geographic or location-based limitations may be beneficial to maximize coverage of area with poor or obstructed reception. These limitations and others may be applicable to the embodiments disclosed herein. These and further limitations are also discussed below.

The cluster 410 comprises the provider STA 402, the proxy STA 406, and the limited proxy STA 405 providing service to the seeker STA 408 and the seeker STA 412. In the cluster 410, however, at least the proxy STA 405 may have additional limitations imposed to reduce transmissions on behalf of the provider STA 402. The limited proxy STA 405 is thus shown as a member proxy station with reduced transmission, as shown in the key of FIG. 4A. One of the limitations above may be included in the provider STA's 402 service advertisement limiting the frequency of the limited proxy STA 405 service broadcasts. The limited proxy STA 405 may be limited because of the lower hop count from the provider STA 402 to the seeker STA 412, or in some embodiments the limited proxy STA 405 made have transmission restrictions imposed because the range of the proxy STA 406 is great enough to cover both of the seeker STAs 408 and the seeker STA 412, eliminating the need for the limited proxy STA 405 services. Thus the proxy STA 404 of the cluster 400 becomes the limited proxy STA 405 in the cluster 410. In some embodiments, other restrictions may also be imposed, such as further limiting the limited the STA 405 to a finite list of neighbor STAs that does not include the seeker STA 408 or the seeker STA 412. Alternatively, the first proxy STA 404 of the cluster 400 may reduce the frequency of proxy broadcasts if it receives at least one broadcast from a second proxy (e.g., the STA 406) having the same or lower hop count from the provider STA 402 (through the proxy STA 406) to the seeker STA 412, and the proxy STA 404 and the second proxy STA 406 share a common neighborhood (e.g., the cluster 400 or the cluster 410).

In an embodiment, the conditions in which a given cluster operates may periodically change as individual STAs require different or new services and enter or leave a neighborhood, or cluster. The cluster 415 comprises the provider STA 402, the limited proxy STA 405, the proxy STA 406, the seeker STA 408, and the seeker STA 412. This topology is identical to cluster 410, except that the cluster 415 comprises a new seeker STA 414 that may have recently received either one of the limited broadcast transmissions from the limited proxy STA 405, a service advertisement from provider STA 402, or a broadcast from the proxy STA 406. In accordance with FIG. 3, the seeker STA 414 may then transmit a discovery request 314 to connect with the desired services of the provider STA 402. Once the discovery request 314 is received, the restrictions previously imposed upon the limited proxy 405 in cluster 410 may no longer be relevant, at which point the limited proxy STA 405 may return to its previous state and again be the proxy STA 404, as shown in the cluster 420. Thus the cluster 420 depicts the provider STA 402 with the proxy STA 404 and the proxy STA 406 that may serve to relay information and services to the seeker STAs 408, 412, 414. As mentioned above, the seeker STAs 408, 412, 414 may subsequently become additional proxy STAs subject to any limitations, providing further range and multi-hop services to STAs not currently members of the cluster 420.

Figure 4B:
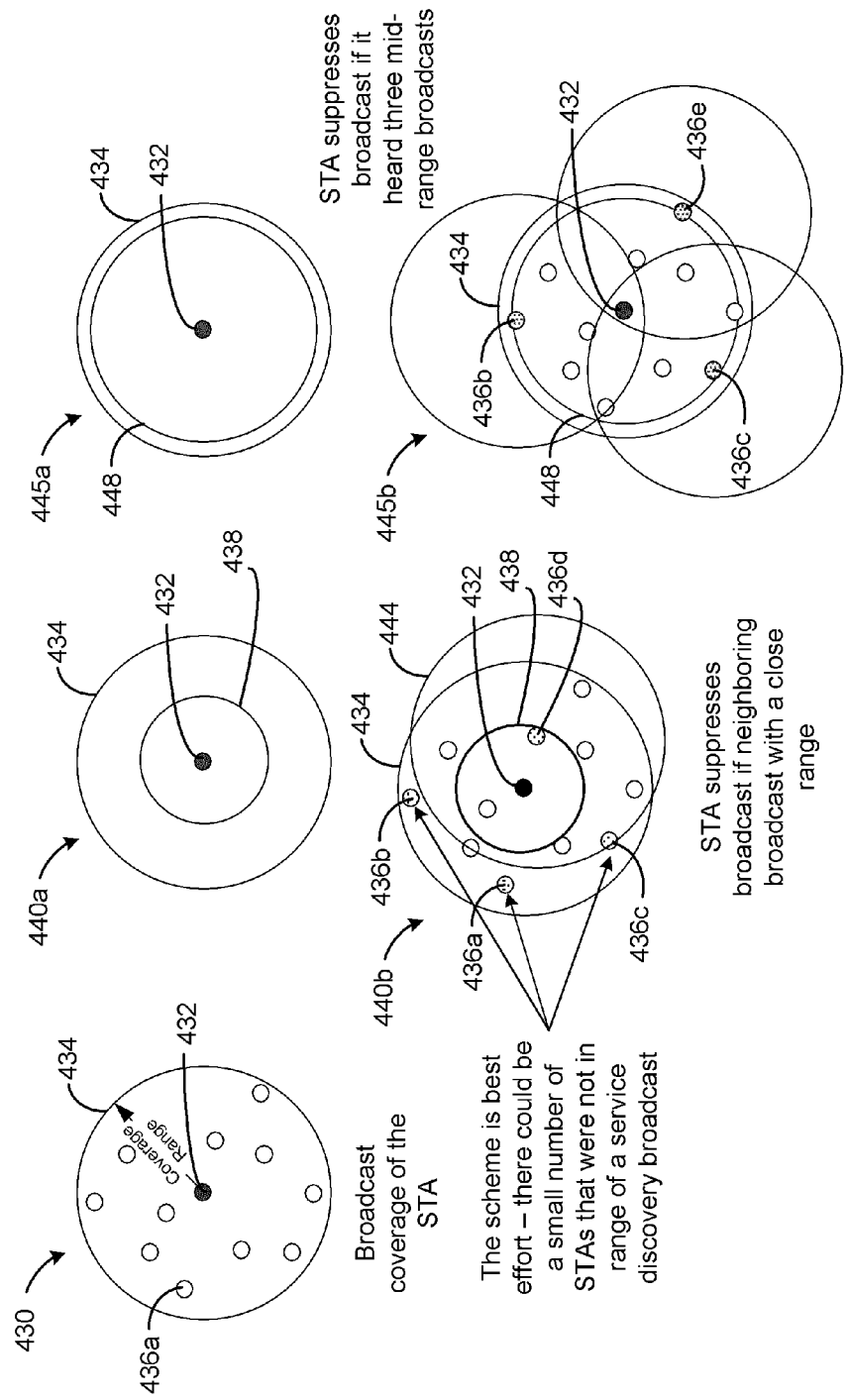
FIG. 4B depicts multiple exemplary topologies of a wireless network depicting another embodiment of a method of operation in accordance with the disclosure.

FIG. 4B illustrates techniques for minimizing flooding of service discovery messages according to the disclosure. Three topologies 430, 440, 445 are shown, illustrating various limitations. Service discovery flooding may occur when every STA that has found a service transmits a proxy broadcast for their respective provider STA. For example as discussed with regard to cluster 400 of FIG. 4A, if the proxy STA 404, the proxy STA 406, and the provider STA 402 all broadcast the same information simultaneously, the combined transmissions may overwhelm the medium and lead to increased data loss. FIG. 4B includes three topologies 430, 440, and 445 implementing the techniques to reduce such flooding.

The topology 430 illustrates a coverage range 434 of a single STA 432. Subsequent discussion of FIG. 4B and FIG. 4C may refer to the STA 432 as a provider STA 432 or proxy STA 432, and the coverage range 434. Specifically, the coverage range 434 will refer to the circumference of the circle a shown in topology 430, and represents the extent of the useful signal for services from the STA 432.

Within the coverage range 434, the STA 432 may provide services to each of the various seeker STAs 436. While not every seeker STA 436 is identified within FIG. 4B for simplicity, it should be appreciated that each of the empty circles in FIG. 4B represents a seeker STA, unless otherwise identified. Accordingly, the seeker STAs may be referred to collectively as seeker STAs 436 herein.

As shown, the topology 430 includes the STA 432 and multiple seeker STAs 436, all falling within the coverage range 434. The seeker STAs 436 may or may not be actually making use of the services provided by the provider STA 432.

Turning to the topology 440a, 440b, the STA 432 is shown with the associated coverage range 434 and a close range 438. The close range 438 is a measurement of a "high" RSSI or a measurement at close range. In an embodiment, the "high" RSSI may be a comparative measurement against a maximum signal strength from the STA 432, and may be manifested, for example, as a signal detection at 50 percent of the full coverage range 434 of the STA 432. In another embodiment the close range 438 measurement may be lower, such as a signal detection at 40-45 percent of the full coverage range 434 of the STA 432. The close range 438 is discussed in more detail below. These measurements may further be subject to interference from structures (not shown) between the various devices.

In accordance with the disclosure, one of the various techniques employed to minimize the flooding may use the close range 438 as a limitation applied to the number of rebroadcast messages transmitted by a proxy STA 432. In an embodiment such a technique may be referred to as a "best effort" as shown in the topology 440b. As noted above, all seeker STAs 436 in receipt of a service advertisement 308 (FIG. 3) from STA 432 may attempt to forward the service advertisement 308 (e.g., proxy broadcast 312) as discussed previously.

In an embodiment, for every service advertisement 308 received, the STA 432 and the STA 436 may buffer the frame in a memory (e.g., memory 206 (FIG. 2)) while the processor 204 may select a random number and begin a countdown. Once the countdown reaches zero, the STA 432 and the STA 436 may rebroadcast the received service advertisement 308 (becoming a proxy STA 432 and a proxy STA 436, respectively).

As shown in topology 440b, the STA 432 may receive the service advertisement 308 from a provider STA (not shown) and apply the random countdown to the buffered broadcast message. During the countdown, the proxy STA 432 may suppress the proxy broadcast 312 based on certain criteria. In an embodiment, the proxy STA 432 may receive the same proxy broadcast 312 from another proxy STA 436d within a short range 438 and suppress any subsequent retransmissions of the same proxy broadcast 312 while the proxy STA 436d is within the close range 438. This would suggest that there is another proxy STA 436 in close proximity whose recent rebroadcast has likely already reached the other seeker STAs 436. Such a limitation may prevent all of the seeker STAs 436 and the STAs 432, 436 from transmitting the same rebroadcast 318 of the same information at the same time, minimizing collisions and data loss.

Accordingly, the STA 436a and the STA 436b, which would otherwise benefit from a rebroadcast from the STA 432, may not be in receipt of the proxy broadcast 312 from the STA 436d. However, STA 436c is within a coverage range 444 of STA 436d and may subsequently act as a proxy STA 436c and transmit the proxy broadcast 312 to the other seeker STAs 436 (e.g., STA 436a and STA 436b) not in receipt, provided no other restrictions are in place.

Turning to topology 445a, 445b of FIG. 4B, a midrange 448 RSSI limitation may also be implemented. Similar to the short range 438 limitation of the topology 440, the midrange 448 places a limitation on which proxy STAs may rebroadcast. In an embodiment, if the STA 432 is again in receipt of the service advertisement 308 from a provider STA (not shown), the processor 204 may refrain from commanding a retransmission of the service advertisement 308 if, during the countdown, the STA 432 receives three other proxy transmissions of the same service advertisement 308 at the midrange 448. The midrange 448 may describe the relative RSSI of a signal received from a position at 80-85 percent, for example, of the full range coverage 434. In some embodiments, the midrange 448 may be lower, such as 70-80 percent of the full coverage range 434. The three transmissions may be indicate that the STA 432 is approximately within a triangle formed by the three proxy STAs 436b, 436c, 436e from which it received the same proxy broadcast 312. This may further indicate that the collective coverage of the three STAs 436b, 436c, 436d is sufficient to provide coverage for the area that might otherwise be covered by a proxy broadcast from the STA 432 to the other seeker STAs 436.

While not specifically described herein for simplicity, the close range 438 the midrange 448 and the specific example of the three transmissions from the three proxy STAs 436b, 436c, 436e should not be considered limiting. In an embodiment, other geometries are possible implementing four or more transmissions in addition to varying the required geometries of the incoming proxy broadcasts 312 to a given STA in order to limit service advertisement flooding.

In an embodiment, the member stations (e.g., the STA 432 and the STAs 436) of each cluster shown in the topology 440 and the topology 445 may further include a source MAC address and sequence number in the service advertisement or proxy communications, allowing more efficient comparison and suppression of unnecessary communications. In the absence of such information, each proxy STA 432 would need to inspect and compare every received service discovery message to identify if it is a previously received packet which needed not be retransmitted since the suppression criteria (e.g., the close range 438 or the midrange 448) were satisfied. In an embodiment, the comparison of every bit in each frame would lead to increase processing overhead. Various advantages of the inclusion of such information are addressed below with respect to FIG. 4C.

Figure 4C:
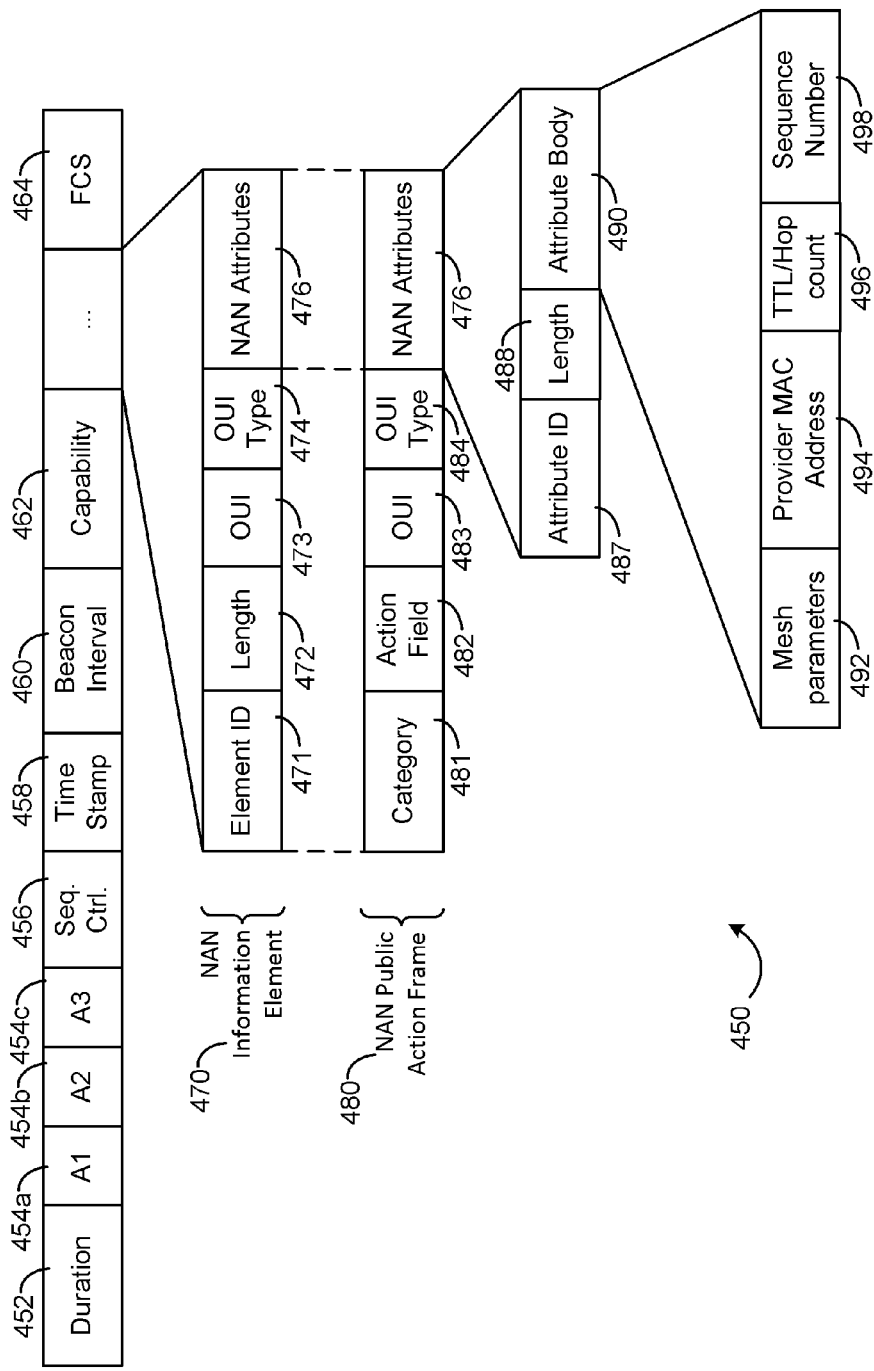
FIG. 4C depicts an embodiment of a service advertisement frame format according to the disclosure.

FIG. 4C illustrates a possible NAN frame format 450 that may be implemented to further reduce the number of STAs 436 that act as proxy STAs, minimizing flooding in a NAN cluster. In an embodiment, certain service announcement broadcasts (e.g., service announcement 308), may include additional parameters as shown in the NAN frame format 450.

The NAN frame format 450 may comprise certain standard frames such as a duration field 452, addressing blocks 454a-454c, sequence control field 456, a time stamp field 458, a beacon interval field 460, a capability field 462, and a frame check sequence ("FCS") field 464.

In an embodiment, NAN frame format 450 further comprises a vendor-specific NAN Information Element (IE) 470 or a vendor-specific NAN Public Action Frame 480.

The NAN IE 470 may include blocks for the Element Identification (ID) field 470, length field 472, Organizationally Unique Identifier (OUI) field 473, OUI type field 474, in addition to various NAN attributes 476. Similarly, the NAN public action frame format 480 may comprise blocks for a category field 481, action field 482, OUI field 483, OUI type field 484, and various NAN attributes 486.

Common to both the NAN IE 470 and the NAN public action frame 480 formats are the NAN attributes 476, also referred to herein as service descriptor attributes 476. The NAN attributes may be further broken down into blocks for an attribute ID field 487, a length field 488, and a service descriptor attribute body field 490.

In an embodiment, a provider STA (e.g., STA 120 (FIG. 1A), the provider STA 304 (FIG. 3)), and more specifically the processor 202, may utilize information contained within the attribute body field 490 to limit the retransmissions of service advertisements 308 as proxy broadcasts 312 as discussed above. The provider STA 120 may include various service descriptor attributes 490 (within the public action frame 480) in service advertisements 308 to seeker STAs 135 (FIG. 1A) that are not already members of a given cluster (e.g., the cluster 100). In another embodiment, the NAN IE 470 may be incorporated into a NAN frame format 450 for use within the NAN cluster 100 for limiting retransmissions from seeker STAs (e.g., STAs 110, 130 (FIG. 1A)) that are already members of the cluster 100.

The attribute body field 490 may comprise one or more NAN attributes. In an embodiment, the attribute body field 490 comprises mesh parameters 492. The mesh parameters 492 indicate in which mesh a particular service is available. As noted above with respect to FIG. 1B, meshes may be formed predicated on common applications, common operating system, common device, or other pertinent characteristics. Furthermore, as noted above, a mesh can support more than one service or application; all the participating devices may proxy the respective services.

In an embodiment, the service descriptor attribute body field 490 may include a MAC address 494 of the provider STA (e.g., the STA 304 of FIG. 3). The inclusion of the MAC address field 494 of the provider STA 304 may enable the various members of a cluster 100, NAN, or other social Wi-Fi mesh network, e.g., the meshes 172, 174, 176 (FIG. 1B) to form routes to the provider STA 304 of the service and reduce redundant proxy broadcasts 312. The use of the MAC address 494 is discussed below.

In another embodiment, the service descriptor attribute body 490 comprises a time to live (TTL) field 496a or hop count field 496b. The TTL/hop count may be useful to limit the number of hops over which the associated service is available. By limiting the number of hops over which a service is available, the end-to-end latency from provider STA, to proxy STA(s), to seeker STA is reduced. A TTL field 496a may allow a provider STA to set the maximum number of hops over which a selected service is available. Similarly, a hop count field 496b may inform a given provider STA or seeker STA over how many hops a given service may be proxied. Both the TTL/hop count field 496 may provide a relative measure of reliability to the seeker STA.

In an embodiment, the service descriptor attribute comprises a sequence number 498. The sequence number field 498 may prevent a service advertisement 308 from being rebroadcast multiple times, or otherwise "looping" as the proxy STA forwards a the service announcements 308 from the provider STA. Service advertisement messages from the provider STA (e.g., STA 304) may include a sequence number field 498 to help proxy STAs 432 suppress duplicate or unnecessary forwarding of service advertisements 308. The use of the sequence number field 498 and/or the provider MAC address 494 may allow the proxy STA 432 to quickly identify if the received frame is a new advertisement frame that must be forwarded or not.

In an embodiment using the frame format of FIG. 4C, the proxy STA 432 may receive the service advertisement 308, containing the MAC address 494 and the sequence number field 498, and compare the most recently received MAC address 494 and the sequence number field 498 to that of the previously buffered advertisements 308. If the data match, then the proxy STA 432 will be informed that the matching service advertisement 308 need not be retransmitted, thereby reducing flooding. Advantageously, this may require less from the processor 204 alleviating the need to compare every bit of a received service advertisement 308; the proxy STA 432 need only compare individual fields.

Advantageously, the disclosed processes may enable successful discovery of a service over multiple hops. In an embodiment, use of the methods disclosed in FIG. 1A through FIG. 4C do not require active collaboration between seeker STAs (e.g. seeker STAs 436). Additionally, the disclosed methods require no direct message exchanges between STAs that have yet to find the service (e.g., STAs 436, 135). Furthermore, STAs 436 need not actively participate in the service discovery process, but can be in a power save mode, or otherwise remain passive awaiting a service advertisement 308 and react only when the seeker STA 436 receives a service advertisement in its NAN.

In an embodiment, a proxy STA (e.g., the proxy STA 302) can further serve as an authentication device, that is, a device with which a new seeker STA (e.g., the seeker STA 306, 436) may authenticate or associate, in order to join the mesh network. This further relieves the provider STA (e.g., the provider STA 304, 432) from having to authenticate each seeker STA (e.g., the seeker STA 306 or the seeker STA 436) on its own.

Figure 5:
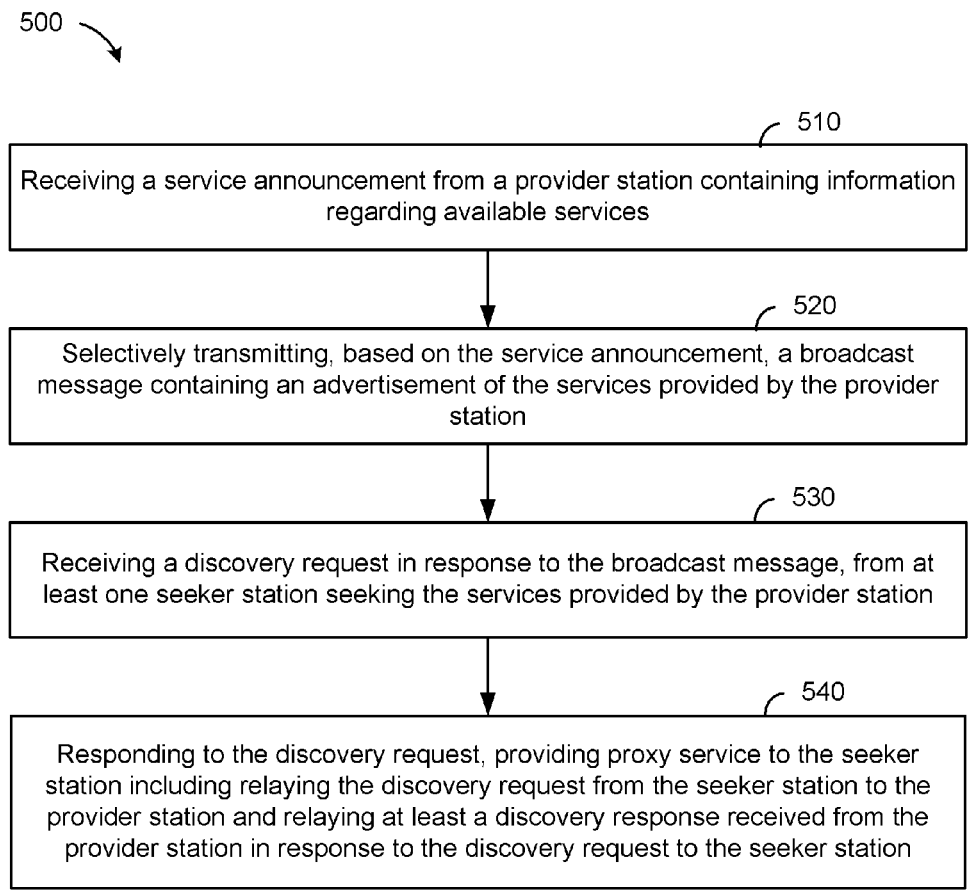
FIG. 5 is a flowchart depicting a method of operation of a mobile device of FIG. 1A, in accordance with the disclosure.

FIG. 5 is a functional block diagram depicting an exemplary embodiment of a method 500 according to the disclosure. The method 500 begins at block 510, where a seeker STA (such as mobile device 130 or seeker STA 302) may receive a service advertisement 308 announcement from a provider STA (such as provider STA 120, 304, 402 above) indicating a desired service sought by, or already being used by the seeker STA 302. If not already completed, the seeker STA 302 may transmit a discovery request for the available service from the provider STA 304 and initiate communications. It should be noted that while the FIG. 5 is described predominantly with reference to the features of FIG. 3, the other clusters, NANs, or meshes disclosed herein may also implement any of the methods described above.

At block 520, and as described above with respect to FIG. 4A and FIG. 4B, a seeker STA 302 using the services of a provider STA 304 may then eligible to become a proxy STA 302. Proxy STA 302 may then selectively transmit a service announcement, advertising the services available from the provider STA, depending on relevant restrictions from the provider STA 304. Restrictions or applicable parameters applying conditions on the status of a given STA 302 as a proxy may be received in the service advertisement 308 or other relevant communications. Such a transmission may comprise a broadcast message. Any restrictions such as those discussed above with respect to the previously discussed figures, (e.g., FIG. 4A, FIG. 4B, FIG. 4C: restrictions comprising hop count limitations, parent nodes, specific lists of nodes within a neighborhood, addressing, range limitations, NAN attributes, etc.) may be evaluated at the seeker STA 302 in order to determine whether the seeker STA 302 is to rebroadcast or proxy broadcast the service advertisement 308, thus becoming a proxy STA 302. In the event the seeker STA becomes a proxy STA, then a proxy broadcast 312 may be broadcast on behalf of the provider STA 304.

At block 530 a proxy STA, such as the proxy STA 302, the device 130, or the proxy STA 406, receives a discovery request 314 from another seeker STA 135, 306, 414 not currently in the cluster (e.g., the cluster 100 or the cluster 320), following receipt of the broadcast proxy broadcast 312 from proxy STA 302. The discovery request 314 indicates a need of the seeker STA 306 to use the services provided in the given cluster 320. At block 540 the discovery response 314 is transmitted by the proxy STA 302 on behalf of the provider STA 304 acting as a relay and extension of services. The block 540, may further include relaying the discovery request 314 from the seeker STA 306 to the provider STA 304 and relaying at least a discovery response received from the provider station in response to the discovery request, to the seeker station. Accordingly, the proxy STA 302 may act on behalf of the provider STA 304, providing an extension of services for the provider STA 304 without the seeker STA 304 involvement. In an embodiment, the proxy STA 302 may also relay all of the pertinent service data between the provider STA 304 and the seeker STA 306. Such information may include the discovery request 314 to the provider STA 304, any discovery messages (e.g., the proxy discovery response 316) to the seeker STA 304, and/or other data transfer between the provider STA 304 and the seeker STA 306 regarding the supported services.

Figure 6:
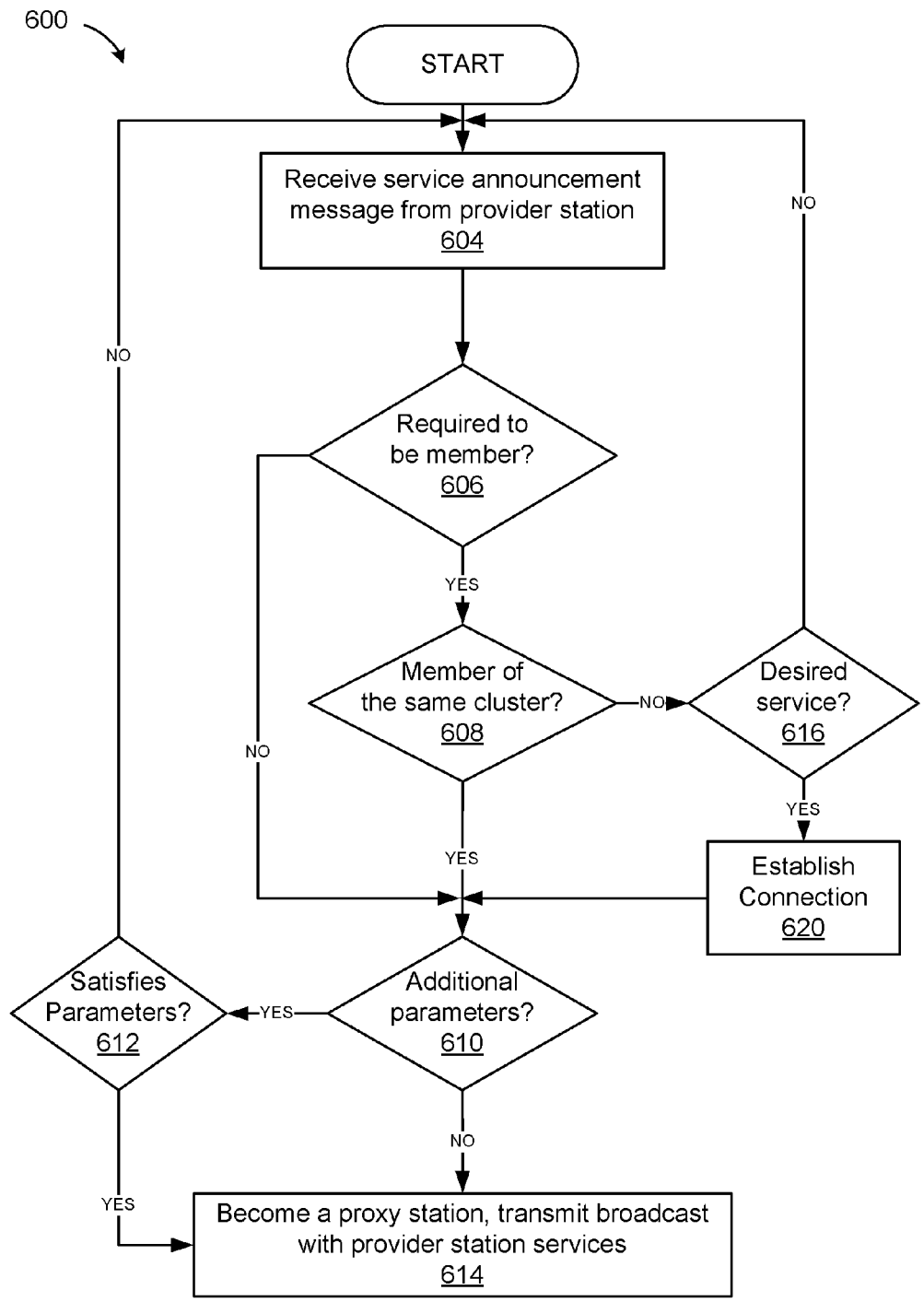
FIG. 6 is a flowchart depicting a method of operation of one or more of the mobile devices of FIG. 1A in accordance with the disclosure.

FIG. 6 depicts a flowchart illustrating a method 600 of the present disclosure. Method 600 relates to a proxy STA, such as proxy STA 302, or the various other embodiments of proxy STAs. FIG. 6 also illustrates an implementation of possible restrictions that may be imposed to determine which STAs may become proxy STAs as disclosed herein. It should be noted that while the FIG. 6 is described predominantly with reference to the features of FIG. 3, and limitations of FIG. 4A-FIG. 4C, the other clusters, NANs, or meshes disclosed herein may also implement any of the methods described.

The process 600 starts at block 604 as a mobile device (such as seeker STA 302/proxy STA 302) receives a service announcement message from a provider STA (such as provider STA 304) advertising the availability of a given service. In an embodiment, the service may be a service currently or previously desired by the seeker STA 302, as described above. At decision block 606, the seeker STA may determine whether any restrictions apply requiring a seeker STA 302 to be a member of the network or cluster (e.g., a NAN) in order to become a proxy STA 302 and advertise services on behalf of the provider STA 304. In the event the seeker STA 302 is required to be a member at decision block 606, the process moves to decision block 608 where the seeker STA 302 may determine if it is already a member of the NAN 320; if so, then the process moves to decision block 610. If at decision block 606 the seeker STA 302 is not required to be a member STA, then the method 600 proceeds to decision block 610. At decision block 610, the seeker STA 302 may determine if there are any additional parameters required by the provider STA 304 to become a proxy STA.

In an embodiment, these additional parameters may be any one of the parameters or restrictions discussed above with respect to FIG. 4A-FIG. 4C, or a combination thereof. For example, the additional parameters in decision block 610 may comprise a hop count restriction or a parent-provider restriction as described in FIG. 4A. Range restrictions or RSSI levels as described with reference to close range 438 and midrange 448 of FIG. 4B may also be included as the additional parameters. Additionally, the various NAN attributes, including the mesh parameters, a provider STA MAC address, a TTL or hop count requirement, or a service advertisement sequence number may also be included as additional parameters that may be used to limit which seekers STAs (e.g., seeker STA 302) become proxy STAs (e.g., proxy STA 302). These parameters may be provided within the provider STA 304 service advertisement or in a separate signal or message. If there are additional parameters, the seeker STA 302 will determine if it satisfies those parameters at decision block 612. If it does not satisfy the parameters, the process may return to decision block 604 and again move through the determination sequences again. If there are no additional parameters required of the seeker STA 302 at decision block 610, or if there are additional parameters at block 610 and seeker STA 302 satisfies the parameters at block 612, then the process moves to block 614 where a seeker STA 302 may become a proxy STA 302.

Referring back to block 608, if the seeker STA is required to be a member of the NAN 320 in order to become the proxy STA 302, and it is not a member STA, then the method 600 moves to block 616. At block 616 the seeker STA 302 may determine if the service advertised is a desired service. If the seeker STA does not desire the advertised services, then the method may begin anew as the seeker STA continues to receive service advertisements. If the service is desired, then seeker STA 302 may connect with the provider STA 304 at block 620 and then move into the rest of the flowchart as discussed above in order to become a proxy STA 302.

Figure 7:
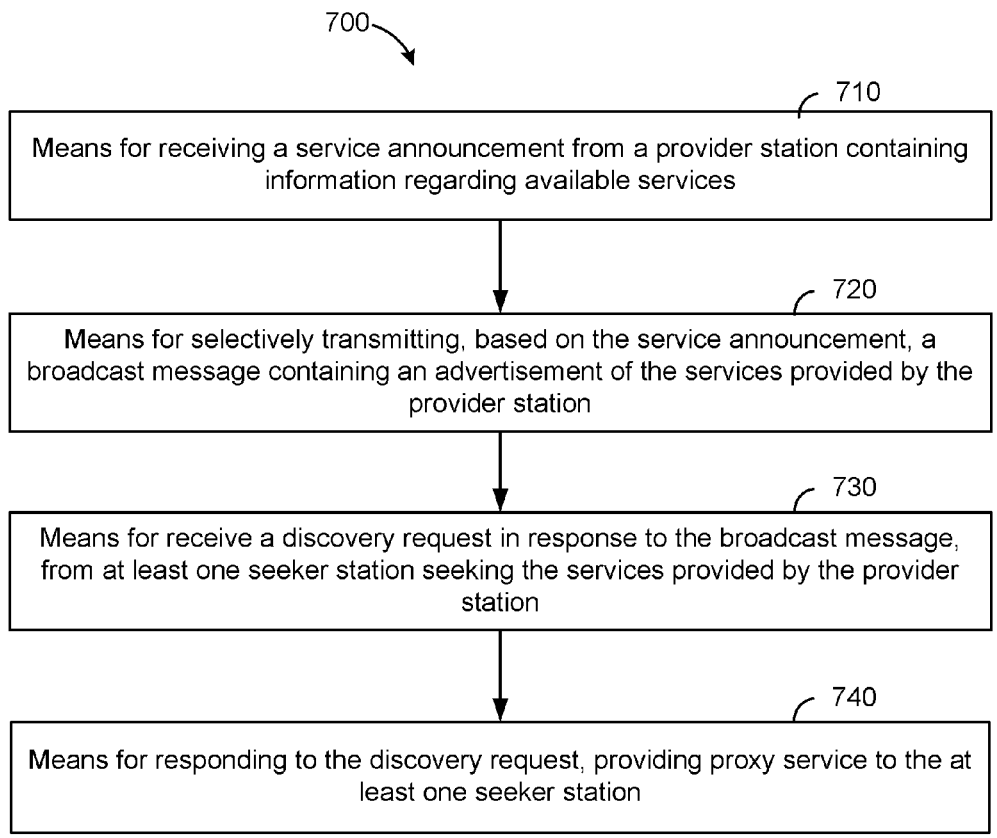
FIG. 7 is a flowchart depicting a method of operation of one or more of the mobile devices of FIG. 1A in accordance with the disclosure.

FIG. 7 depicts functional block diagram of a proxy STA 700 such as proxy STA 302 or other embodiment as described herein. The proxy STA 700 is substantially similar to the proxy STAs described with respect to FIG. 1-FIG. 4C herein. It should be noted that while the FIG. 7 is described predominantly with reference to the features of FIG. 3, particularly proxy STA 302 and various limitations of FIG. 4A-FIG. 4C, the other clusters, NANs, or meshes disclosed herein may also comprise the features described.

Proxy STA 700 comprises means 710 for receiving a service announcement from a provider station containing information regarding available services. Proxy STA 700 further comprises comprising means 720 for selectively transmitting, based on the service announcement, a broadcast message containing an advertisement of the services provided by the provider station. The proxy STA 700 further comprises means 730 for receiving a discovery request in response to the broadcast message, from at least one seeker station seeking the services provided by the provider station. The proxy STA 700 further comprises means 740 for responding to the discovery request, providing proxy service to the at least one seeker station.

The means 710 allows the proxy STA 700 to receive a service announcement from a given provider STA, such as provider STA 304. The service announcement may include specific restrictions or parameters concerning the transmission (or retransmission) of a service announcement by the proxy STA 700. Block 720 allows proxy STA 700 to determine what, if any restrictions or parameters apply to a transmission and select whether to transmit based on such a determination.

The means 730 allows the proxy STA 700 to receive a discovery request (in response to the service announcement) from another seeker STA, such as the seeker STA 306. The proxy STA 700 may further relay that request to the provider STA 304, and the provider STA 304 may respond to proxy STA 700. The means 740 then allows the proxy STA 700 to respond to the seeker STA 306, providing proxy service from the provider STA 304. Thus, with the attributes of the means 710, 720, 730, and 740, the proxy STA 700 is permitted to proxy broadcast service advertisements from the provider STA 304 and act as a proxy provider STA to other seeker STAs (e.g., seeker STA 306) seeking a given service. The proxy STA 700 further may act as a relay for any ensuing transmissions of data to and from the provider STA 304 to the seeker STA 306, through the proxy STA 700.

FIG. 8 is an exemplary topology of a one-hop service discovery shown in topology 800 and topology 850. Topology 800 depicts wireless nodes A through K. Nodes A, B, and K are seeking a service X, provided by node D. Nodes F, G, and H are seeking service Y, provided by node I, and nodes C, E, I, and J are seeking both services X and Y. In topology 800, none of the nodes are connected together as shown by the absence of arrows between them. Moving to topology 850, service advertisement broadcasts 810 are shown as straight solid arrows 810, while discovery requests 820 are shown as dotted arrows. In topology 850 the provider nodes (or provider STAs) broadcast 810 service advertisements, while the noted seeker STAs may broadcast discovery requests 820, indicating the sought after service. For example, node D is a provider for service X and sends out three broadcasts 810, however, the nodes seeking service X (nodes A, B, and K) do not all receive the service; nodes A and B do not get the service as they are more than one hop away. Node K receives the service. The same scenario can be seen with regard to service Y, provided by node I: only the nodes within one hop can receive the service.

FIG. 9 is an exemplary topology of one-hop service discovery shown in a topology 900. The topology 900 comprises three clusters 830, 840, and 850, noting three different clusters of member STAs that are able to utilize the services provided by their respective provider STA. The cluster 830 comprises a provider STA I, providing a service Y, while the cluster 840 and the cluster 850 overlap slightly. Both clusters 840, 850 are utilizing services provided by a provider STA D for service X. The topology 900 depicts only the one-hop seeker STAs I-H, and C, D, E, K can receive the service broadcast or receive a response from the provider STA I and the provider STA D to their respective discovery requests. Accordingly, STA I and STA H become members of service Y and STA C, STA D, STA E, and STA K become members of service X.

FIG. 10 depicts another exemplary topology 1000 of one-hop discovery. In topology 1000, STAs C, D, E, and K are able to reach their respective service provider (provider STA D) and become member STAs of service X. Similarly, STA I is also able to provide service Y to seeker STA H. All of the other seeker STAs shown in the topology 1000 are more than one hop (multi-hop) away, and are thus deprived of service.

Figure 11:
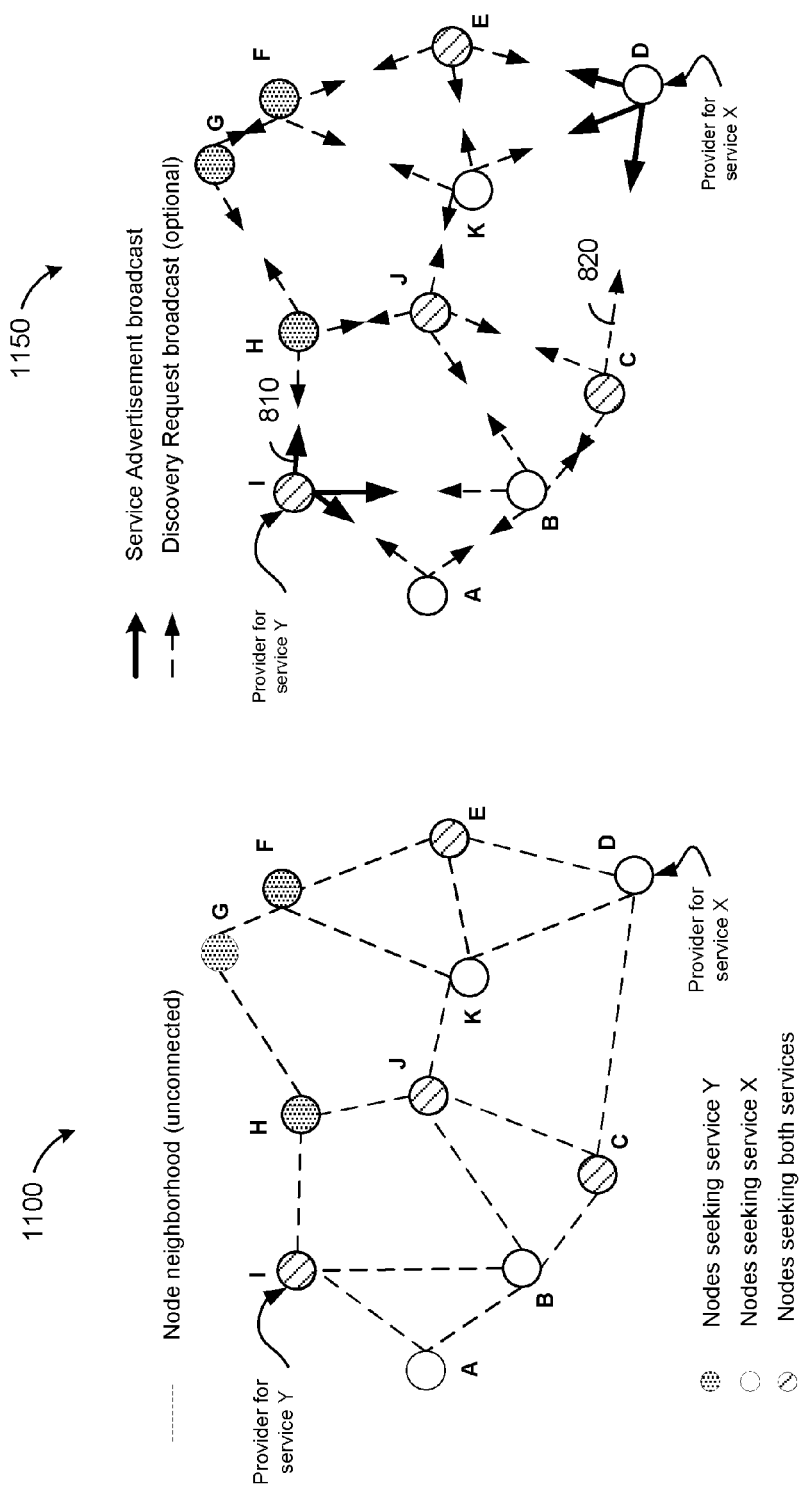
FIG. 11 is an exemplary topology of a wireless cluster implementing one-hop discovery in accordance with the disclosure.

FIG. 11 depicts two more topologies 1100 and 1150 showing an example of proxy-based discovery. The above mentioned STAs remain, however proxy STAs are enabled in the topology 1100 and the topology 1150. Topology 1100 depicts unconnected nodes moving toward becoming connected nodes in topology 1150. In the topology 1150, again the service advertisement broadcasts 810 (straight solid lines) and discovery request broadcasts 820 (dashed lines) may be transmitted during each node's advertisement of services or search for services. As shown, the STA D and the STA I are the provider STAs for service X and service Y, respectively.

Figure 12:
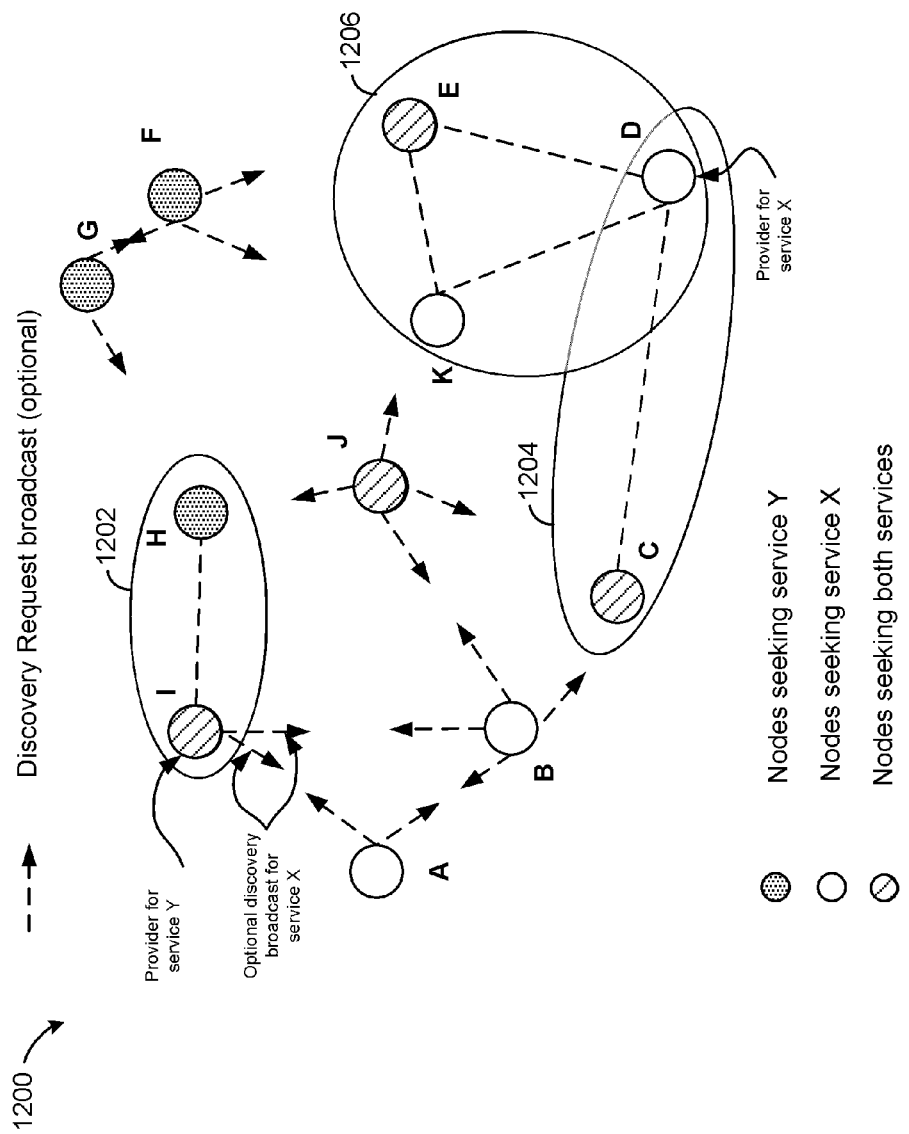
FIG. 12 is an exemplary topology of a wireless cluster implementing one-hop discovery in accordance with the disclosure.

FIG. 12 depicts a topology 1200, wherein the nodes are connected as before, but STAs H, C, E, and K have become connected to their respective service provider STAs I and D, respectively. This is shown with clusters 1202, 1204, 1206 indicating the nodes H, C, E, and K have connected to the service providers and are receiving the respective services X and Y. Since proxy service is enabled, the nodes H, C, E, and K may now become proxy STAs, similar to those discussed above in FIGS. 3 and 4.

Figure 13:
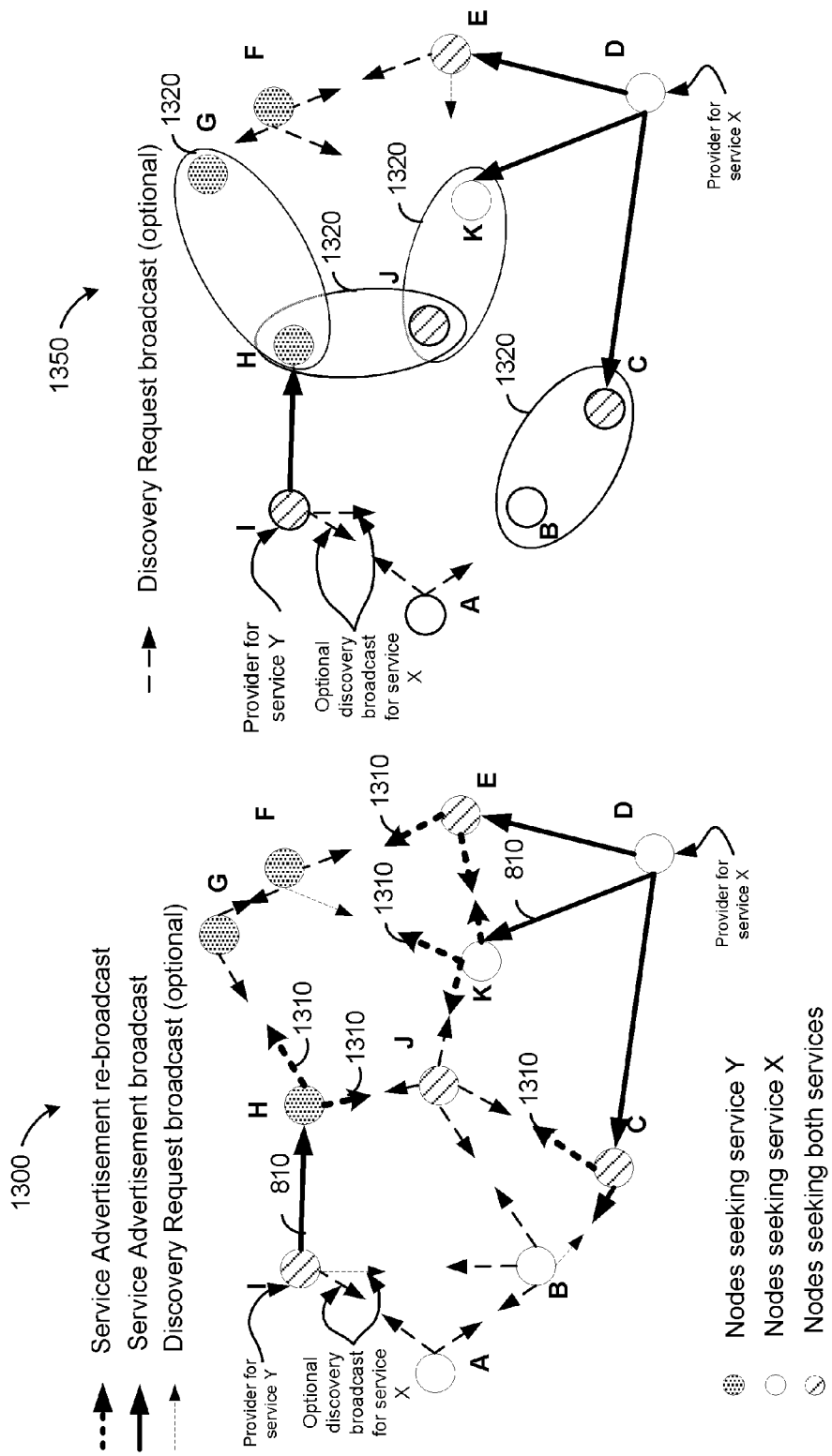
FIG. 13 is an exemplary topology of a wireless cluster implementing multi-hop proxy discovery in accordance with the disclosure.

Referring to FIG. 13, topologies 1300 and 1350 are shown implementing proxy-based discovery, utilizing the methods disclosed herein. In topology 1300, the advertisements 810 (straight solid lines) and requests 820 (dashed lines) are transmitted as before, however nodes H, K, and C may act as proxy nodes (similar to proxy STA 302 of FIG. 3) and transmit or retransmit the service announcement 1310 (dotted lines) for respective provider nodes D and I. In topology 1350, the proxy service enables nodes that are more than one hop away from the provider STAs D and I to connect with the proxy services each seeks, noted by the ovals 1320.

Figure 14:
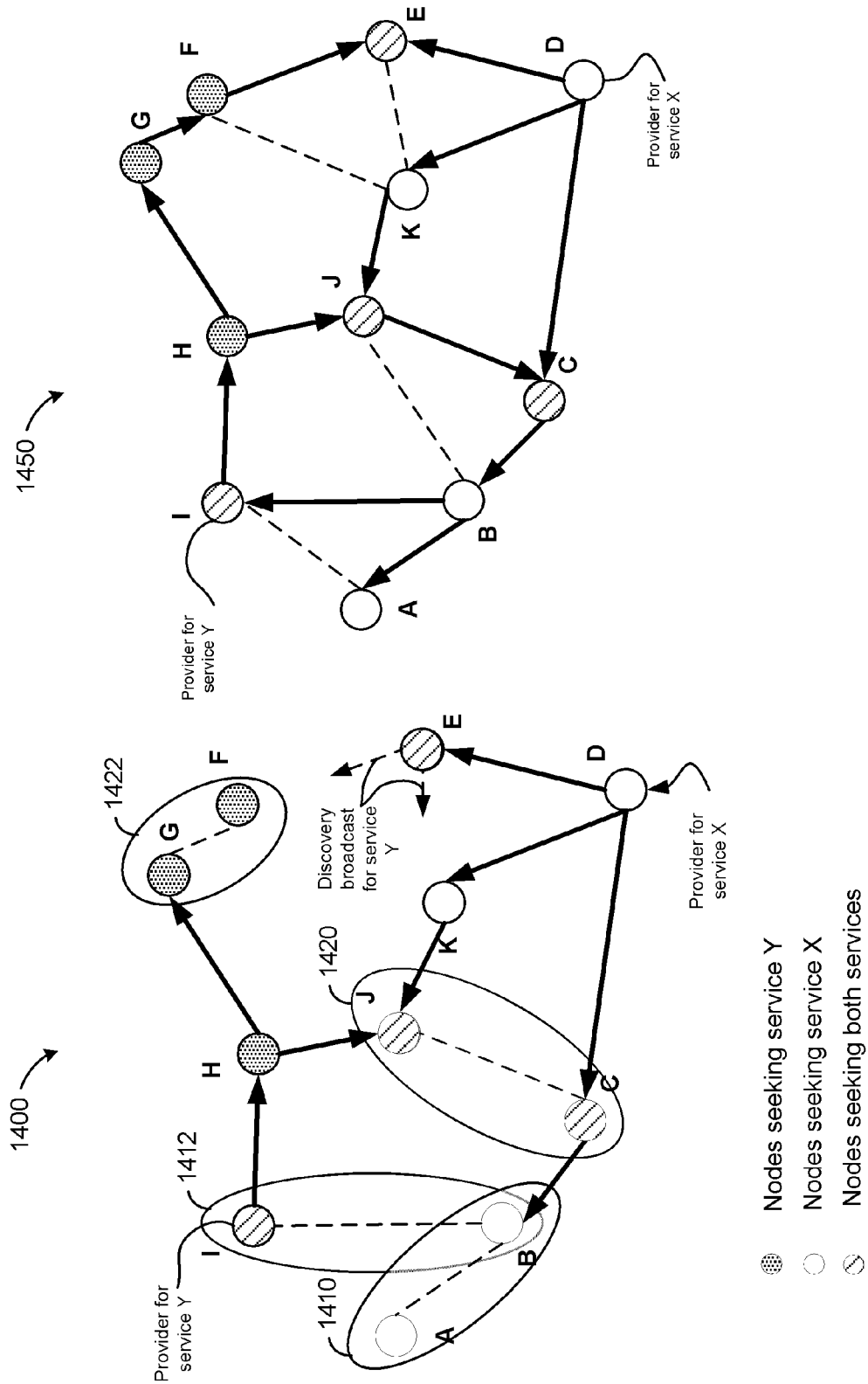
FIG. 14 is an exemplary topology of a wireless cluster implementing multi-hop proxy discovery.

Referring to FIG. 14, the multi-hop proxy-based services are depicted in topologies 1400 and 1450. Because seeker STAs are enabled as proxies to the provider STAs, subject to any restrictions imposed by the provider STAs as discussed above, the service area expands to include nodes A, B, F, and G, nodes that were formerly deprived of service. Not only can the nodes E, C, K, A, B, and H (only one hop away from their respective provider STAs) become proxies, but the nodes they service as proxy STAs (similar to the proxy STA 302 of FIG. 3) may also become proxies. Accordingly, the service X is expanded to include areas 1410, 1422 and the service Y is expanded to include areas 1420, 1422. This flexibility also eases the availability issues regarding a nodes I, C, J, and E seeking both of the services X and Y, as shown.

Figure 15:
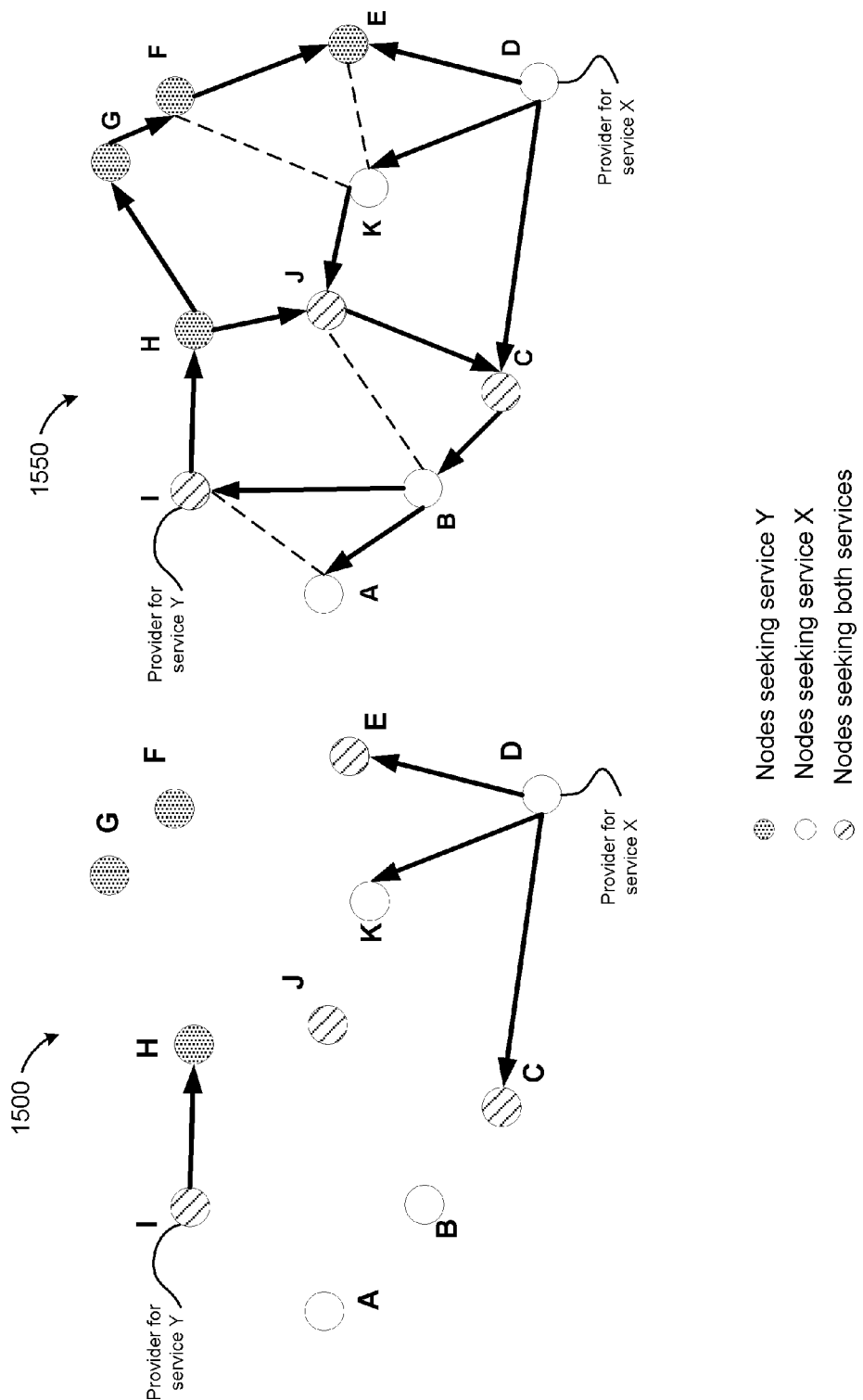
FIG. 15 is an exemplary topology of a wireless cluster implementing multi-hop proxy discovery.

Referring to FIG. 15, topologies 1500 and 1550 compare some of the aspects of the single hop versus the multi-hop service discovery as disclosed herein. Topology 1500 depicts a service distribution tree built with single-hop messaging. As shown, the service X and the service Y reach only one hop away. Topology 1550 expands the capabilities and service distribution of the service X and the service Y by allowing multiple proxy STAs to distribute services. The layout of topology 1550 may be useful to minimize data collisions and loss, maximizing transmission and optimizing service distribution in a wireless cluster.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g., tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method for using proxy messages in a neighbor aware network, comprising:
   receiving, by a first proxy station, a service advertisement of a provider station, the service advertisement indicating services provided by the provider station;
   selectively transmitting, by the first proxy station, in response to the receiving, a first proxy broadcast message, the first proxy broadcast message comprising location information for the first proxy station and the service advertisement, the selection based on whether the provider station is a parent device of the first proxy station, wherein the parent device is a device whose service broadcast was first received by the first proxy station when the first proxy station sought the service, or based on a distance of the first proxy station from the provider station;
   determining a frequency of proxy broadcast transmissions based at least in part on second location information received for a second proxy station; and
   receiving, by the first proxy station, in response to the transmitting, a discovery request from a seeker station, the seeker station being more than one hop from the provider station, the discovery request requesting services from the provider station.

2. The method of claim 1 further comprising:
   receiving data associated with multiple services provided by one or more provider stations;
   transmitting the data to one or more seeker stations; and
   relaying information relating to the multiple services provided by the one or more provider stations between the one or more provider stations and the seeker station.

3. The method of claim 1, wherein the first proxy station is configured to selectively transmit the first proxy broadcast message in response to at least one of the following conditions:
   a number of hops from the provider station through the first proxy to the seeker station is less than a threshold;
   the first proxy station is connecting to or has already connected to the service advertised by the provider station;
   a distance between the provider station and the seeker station is less than a threshold;
   the first proxy station is one of a group of eligible stations in range of the service advertisement or a second proxy broadcast message, wherein the second proxy broadcast message comprises the service advertisement;
   the service advertisement indicates a service that is one of a list of eligible services;
   the second proxy broadcast message is received at the first proxy station from a second proxy station that is not within a close range; or
   the second proxy broadcast message is received at the first proxy station from less than three or more neighboring proxy stations within a medium range, wherein the medium range is longer than the close range.

4. The method of claim 1, further comprising:
   relaying the discovery request from the seeker station to the provider station; and
   relaying to the seeker station at least a discovery response received from the provider station in response to the discovery request.

5. The method of claim 1, the service advertisement comprising a neighbor aware network information element or a neighborhood aware network public action frame comprising at least one of:
   a medium access control address of the provider station;
   a time to live, comprising a maximum number of allowed hops from the provider station to the seeker station over which the service is available, indicated by the provider station;
   a hop count comprising the number of hops over which the service advertisement has been retransmitted by the first proxy station or a second proxy station; and
   a sequence number of the retransmitted service advertisement.

6. A device for proxying messages as a first proxy station in a neighbor aware network, comprising:
   a receiver configured to receive a service advertisement from a provider station, the service advertisement indicating services provided by the provider station; and
   a transmitter configured to selectively transmit, in response to the service advertisement, a first proxy broadcast message comprising location information for the first proxy station and the service advertisement based on whether the provider station is a parent device of the first proxy station or based on a distance of the first proxy station from the provider station, wherein the parent device is a device whose service broadcast was first received by the first proxy station when the first proxy station sought the service, and to reduce a frequency of proxy broadcast transmissions based at least in part on location information received for a second proxy station; and
   wherein the receiver is further configured to receive a discovery request from a seeker station, the seeker station being more than one hop from the provider station, the discovery request requesting services from the provider station.

7. The device of claim 6, wherein the receiver is further configured to receive data associated with multiple services provided by one or more provider stations; and
   wherein the transmitter is further configured to transmit the data to one or more seeker stations; and
   wherein the transmitter and receiver are configured to relay information relating to the multiple services provided by the one or more provider stations between the one or more provider stations and the one or more seeker stations.

8. The device of claim 6, wherein the transmitter is further configured to selectively transmit the first proxy broadcast message in response to at least one of the following conditions:
   a number of hops from the provider station through the first proxy to the seeker station is less than a threshold;
   the first proxy station is connecting to or has already connected to the service advertised by the provider station;
   a distance between the provider station and the seeker station is less than a threshold;

the first proxy station is one of a group of eligible stations in range of the service advertisement or a second proxy broadcast message, wherein the second proxy broadcast message comprises the service advertisement;

the service advertisement indicates a service that is one of a list of eligible services;

the second proxy broadcast message is received at the first proxy station from a second proxy station that is not within a close range; or the second proxy broadcast message is received at the first proxy station from less than three or more neighboring proxy stations within a medium range, wherein the medium range is longer than the close range.

9. The device of claim 6, wherein the transmitter is further configured to:

relay to the seeker station, the discovery request from the seeker station to the provider station; and relay at least a discovery response received from the provider station in response to the discovery request.

10. The device of claim 6, the service advertisement comprising a neighbor aware network information element or a neighborhood aware network public action frame, comprising at least one of:

a medium access control address of the provider station;

a time to live, comprising a maximum number of allowed hops from the provider station to the seeker station over which the service is available, indicated by the provider station;

a hop count comprising the number of hops over which the service advertisement has been retransmitted by the device or a second proxy station; and a sequence number of the retransmitted service advertisement.

11. A device for proxying messages as a first proxy station in a neighbor aware network, comprising:

first means for receiving a service advertisement from a provider station, the service advertisement indicating services provided by the provider station; and first means for selectively transmitting a first proxy broadcast message comprising location information for the first proxy station and the service advertisement, the selection based on whether the provider station is a parent device of the first proxy station or based on a distance of the first proxy station from the provider station, wherein the parent device is a device whose service broadcast was first received by the first proxy station when the first proxy station sought the service;

means for determining a frequency of proxy broadcast transmissions based at least in part on second location information received for a second proxy station, wherein the first receiving means is further configured to receive a discovery request from a seeker station, the seeker station being more than one hop from the provider station, the discovery request requesting services from the provider station.

12. The device of claim 11, the first means for selectively transmitting further configured to selectively transmit the first proxy broadcast message in response to at least one of the following conditions:

a number of hops from the provider station through the first proxy to the seeker station is less than a threshold;

the first proxy station is connecting to or has already connected to the service advertised by the provider station;

a distance between the provider station and the seeker station is less than a threshold;

the first proxy station is one of a group of eligible stations in range of the service advertisement or a second proxy broadcast message, wherein the second proxy broadcast message comprises the service advertisement;

the service advertisement indicates a service that is one of a list of eligible services;

the second proxy broadcast message is received at the first proxy station from a second proxy station that is not within a close range; or the second proxy broadcast message is received at the first proxy station from less than three or more neighboring proxy stations within a medium range, wherein the medium range is longer than the close range.

13. The device of claim 11, further comprising:

means for relaying the discovery request from the seeker station to the provider station; and means for relaying to the seeker station, at least a discovery response received from the provider station in response to the discovery request.

14. The device of claim 11, the service advertisement comprising a neighborhood aware network information element or a neighborhood aware network public action frame, comprising at least one of:

a medium access control address of the provider station;

a time to live, comprising a maximum number of allowed hops from the provider station to the seeker station over which the service is available, indicated by the provider station;

a hop count comprising the number of hops over which the service advertisement has been retransmitted by the device or a second proxy station; and a sequence number of the retransmitted service advertisement.

15. A non-transitory computer readable medium storing code that when executed, causes a first proxy station to:

receive a service advertisement from a provider station, the service advertisement indicating services provided by the provider station;

selectively transmit a first proxy broadcast message comprising location information for the first proxy station and the service advertisement, the selection based on whether the provider station is a parent device of the first proxy station or based on a distance from the provider station, wherein the parent device is a device whose service broadcast was first received by the first proxy station when the first proxy station sought the service, determine a frequency of proxy broadcast transmissions based at least in part on second location information received for a second proxy station, and receive a discovery request from a seeker station, the seeker station being more than one hop from the provider station, the discovery request requesting services from the provider station.

16. The non-transitory computer readable medium of claim 15, the first proxy station being further configured to selectively transmit the first proxy broadcast message in response to at least one of the following conditions:

a number of hops from the provider station through the first proxy to the seeker station is less than a threshold;

the first proxy station is connecting to or has already connected to the service advertised by the provider station;

a distance between the provider station and the seeker station is less than a threshold;

the first proxy station is one of a group of eligible stations in range of the service advertisement or a second proxy broadcast message, wherein the second proxy broadcast message comprises the service advertisement;

the service advertisement indicates a service that is one of a list of eligible services;

the second proxy broadcast message is received at the first proxy station from a second proxy station that is not within a close range; or the second proxy broadcast message is received at the first proxy station from less than three or more neighboring proxy stations within a medium range, wherein the medium range is longer than the close range.

17. The non-transitory computer readable medium of claim 15 further configured to cause the first proxy station to:

relay to the seeker station, the discovery request from the seeker station to the provider station; and relay at least a discovery response received from a provider station in response to the discovery request.

18. The non-transitory computer readable medium of claim 15, the service advertisement comprising a neighborhood aware network information element or a neighborhood aware network public action frame, comprising at least one of:

a medium access control address of the provider station;

a time to live, comprising a maximum number of allowed hops from the provider station to the seeker station over which the service is available, indicated by the provider station;

a hop count comprising the number of hops over which the service advertisement has been retransmitted by the first or a second proxy station; and a sequence number of the retransmitted service advertisement.

* * * * *